(12) United States Patent
Kim et al.

(10) Patent No.: US 12,225,303 B2
(45) Date of Patent: Feb. 11, 2025

(54) METHOD OF OPERATING DYNAMIC VISION SENSOR SYSTEM

(71) Applicant: SAMSUNG ELECTRONICS CO., LTD., Suwon-si (KR)

(72) Inventors: Whoiyul Kim, Seoul (KR); Jeyeon Kim, Goyang-si (KR); Minsu Kim, Seoul (KR)

(73) Assignees: SAMSUNG ELECTRONICS CO., LTD., Suwon-si (KR); IUCF-HYU {INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 172 days.

(21) Appl. No.: 18/053,184

(22) Filed: Nov. 7, 2022

(65) Prior Publication Data

US 2023/0156355 A1    May 18, 2023

(30) Foreign Application Priority Data

Nov. 12, 2021    (KR) .......................... 10-2021-0155578

(51) Int. Cl.
*H04N 25/50*    (2023.01)
*G06T 7/11*    (2017.01)
(Continued)

(52) U.S. Cl.
CPC .............. *H04N 25/50* (2023.01); *G06T 7/11* (2017.01); *G06T 7/136* (2017.01); *G06T 7/215* (2017.01);
(Continued)

(58) Field of Classification Search
CPC ........ H04N 25/50; H04N 25/77; H04N 25/47; G06T 7/11; G06T 7/136; G06T 7/215;
(Continued)

(56) References Cited

U.S. PATENT DOCUMENTS 9,256,957 B1    2/2016 Frey et al.
9,389,693 B2    7/2016 Lee et al.
(Continued)

FOREIGN PATENT DOCUMENTS

| KR | 10-2017-0043880 | 4/2017 |
|---|---|---|
| KR | 10-2006905 | 10/2019 |
| KR | 10-2021-0010408 | 1/2021 |

*Primary Examiner* — Fernando Alcon
(74) *Attorney, Agent, or Firm* — F. CHAU & ASSOCIATES, LLC

(57) ABSTRACT

A method of operating a dynamic vision sensor system includes: obtaining event signals from a plurality of dynamic vision sensor pixels over a predetermined time period, wherein the event signals correspond to a measured change in light; obtaining original image data based on the event signals output by the plurality of DVS pixels and including a plurality of image pixels, wherein the plurality of image pixels respectively correspond to the plurality of dynamic vision sensor pixels; obtaining binary image data by binarizing pixel values of the plurality of image pixels; defining a plurality of pixel groups from the plurality of image pixels in the binary image data; and selecting a plurality of effective groups from among the plurality of pixel groups that represent the movement of an object.

20 Claims, 16 Drawing Sheets

(51) Int. Cl.
  *G06T 7/136*  (2017.01)
  *G06T 7/215*  (2017.01)
  *G06T 7/246*  (2017.01)
  *H04N 25/77*  (2023.01)

(52) U.S. Cl.
  CPC ............. *G06T 7/246* (2017.01); *H04N 25/77*
        (2023.01); *G06T 2207/30241* (2013.01)

(58) Field of Classification Search
  CPC . G06T 7/246; G06T 2207/30241; G06T 7/62;
                                        G01B 11/24
  See application file for complete search history.

(56) References Cited

U.S. PATENT DOCUMENTS

| | | |
|---|---|---|
| 9,875,390 B2 | 1/2018 | Lee et al. |
| 10,639,537 B2 | 5/2020 | Kiraly et al. |
| 2015/0030204 A1* | 1/2015 | Lee .................... G06T 7/246 |
| | | 382/103 |
| 2016/0203610 A1* | 7/2016 | Lee .................... G06V 40/16 |
| | | 382/103 |
| 2018/0262705 A1* | 9/2018 | Park .................... H04N 25/79 |
| 2018/0308253 A1* | 10/2018 | Ryu ..................... G06T 7/38 |
| 2019/0364230 A1* | 11/2019 | Yeo ..................... H04N 25/40 |
| 2020/0005468 A1* | 1/2020 | Paul .................... G06V 10/25 |
| 2021/0074745 A1* | 3/2021 | Mi ...................... H01L 27/1463 |
| 2021/0185258 A1* | 6/2021 | Kim .................... H04N 25/50 |
| 2021/0279890 A1* | 9/2021 | Mou .................... G06T 7/215 |
| 2021/0350145 A1* | 11/2021 | Park .................... B60W 60/0027 |
| 2021/0398292 A1* | 12/2021 | Yoshida ............... G06T 7/207 |
| 2022/0014702 A1* | 1/2022 | Yin ..................... H04N 25/707 |
| 2022/0311910 A1* | 9/2022 | Zhou .................... G06T 7/181 |
| 2023/0236321 A1* | 7/2023 | Song .................... H04N 23/667 |
| | | 356/4.01 |
| 2023/0336682 A1* | 10/2023 | Ise ...................... G06T 5/50 |

* cited by examiner

METHOD OF OPERATING DYNAMIC VISION SENSOR SYSTEM

CROSS-REFERENCE TO RELATED APPLICATION(S)

This U.S. non-provisional application claims priority under 35 U.S.C. § 119 to Korean Patent Application No. 10-2021-0155578 filed on Nov. 12, 2021 in the Korean Intellectual Property Office, the disclosure of which is incorporated by reference herein in its entirety.

TECHNICAL FIELD

Example embodiments of the present disclosure relate to a method of operating a dynamic vision sensor system.

DISCUSSION OF THE RELATED ART

Cameras are provided as functional components for many electronic devices. For example, cameras can be built into mobile phones, gaming systems, cars, and the like. Some examples of personal digital cameras include mirrorless and digital single lens reflex (DSLR) type cameras. Different camera technologies are used to prioritize low light performance, fast auto-focus, high frames-per-second shooting, and the like. In some cases, users need to be able to track fast moving objects when using the camera. This may require a specialized camera system configured to detect movement.

A dynamic vision sensor (DVS) system may include pixels that are configured to sense changes in brightness of light and to output an event signal based on the changes in brightness of light, and may recognize shapes and movements of objects based on the event signal output by each of the pixels. A dynamic vision sensor system has been used in various fields to detect and track moving objects.

SUMMARY

An example embodiment of the present disclosure includes a method of operating a dynamic vision sensor system which may, in tracking a moving object using a dynamic vision sensor system, accurately determine a trajectory of movement of an object in consideration of a shape and size of the object recognized in advance.

According to an example embodiment of the present disclosure, a method of operating a dynamic vision sensor system includes: obtaining event signals from a plurality of dynamic vision sensor pixels over a predetermined time period, wherein the event signals correspond to a measured change in light; obtaining original image data based on the event signals output by the plurality of DVS pixels and including a plurality of image pixels, wherein the plurality of image pixels respectively correspond to the plurality of dynamic vision sensor pixels; obtaining binary image data by binarizing pixel values of the plurality of image pixels; defining a plurality of pixel groups from the plurality of image pixels in the binary image data; and selecting a plurality of effective groups from among the plurality of pixel groups, wherein each of the plurality of effective groups is determined to correspond to an object based on at least one of a size, a shape, or a trajectory of the object, and outputting result data representing the plurality of effective group.

According to an example embodiment of the present disclosure, a method of operating a dynamic vision sensor system includes obtaining original image data including a plurality of image pixels corresponding to a plurality of dynamic vision sensor (DVS) pixels; classifying the plurality of image pixels into first image pixels having a first pixel value and second image pixels having a second pixel value different from the first pixel value; grouping the first image pixels into a plurality of pixel groups; selecting a plurality of effective groups from the plurality of pixel groups by determining the number of first image pixels in each of the plurality of pixel groups, determining an arrangement shape of the first image pixels in each of the plurality of pixel groups, and selecting a pixel group as an effective pixel group based on the number of first image pixels and the arrangement shape; and determining a movement speed and trajectory of an object using the plurality of effective groups.

According to an example embodiment of the present disclosure, a method of operating a dynamic vision sensor system includes obtaining image data having a plurality of image pixels corresponding to a plurality of dynamic vision sensor (DVS) pixels configured to detect a change in light caused by movement of an object; obtaining a plurality of pixel groups by grouping first image pixels from among the plurality of image pixels, wherein the first image pixels correspond to DVS pixels that detected a change in light over a predetermined period; and selecting a plurality of effective groups, each effective group representing a position and a shape of the object at each of a plurality of time points from the plurality of pixel groups, and determining movement of the object using the plurality of effective groups.

BRIEF DESCRIPTION OF DRAWINGS

The above and other aspects, features, and advantages of the present disclosure will be more clearly understood from the following detailed description, taken in combination with the accompanying drawings, in which.

DETAILED DESCRIPTION

Figure 1:
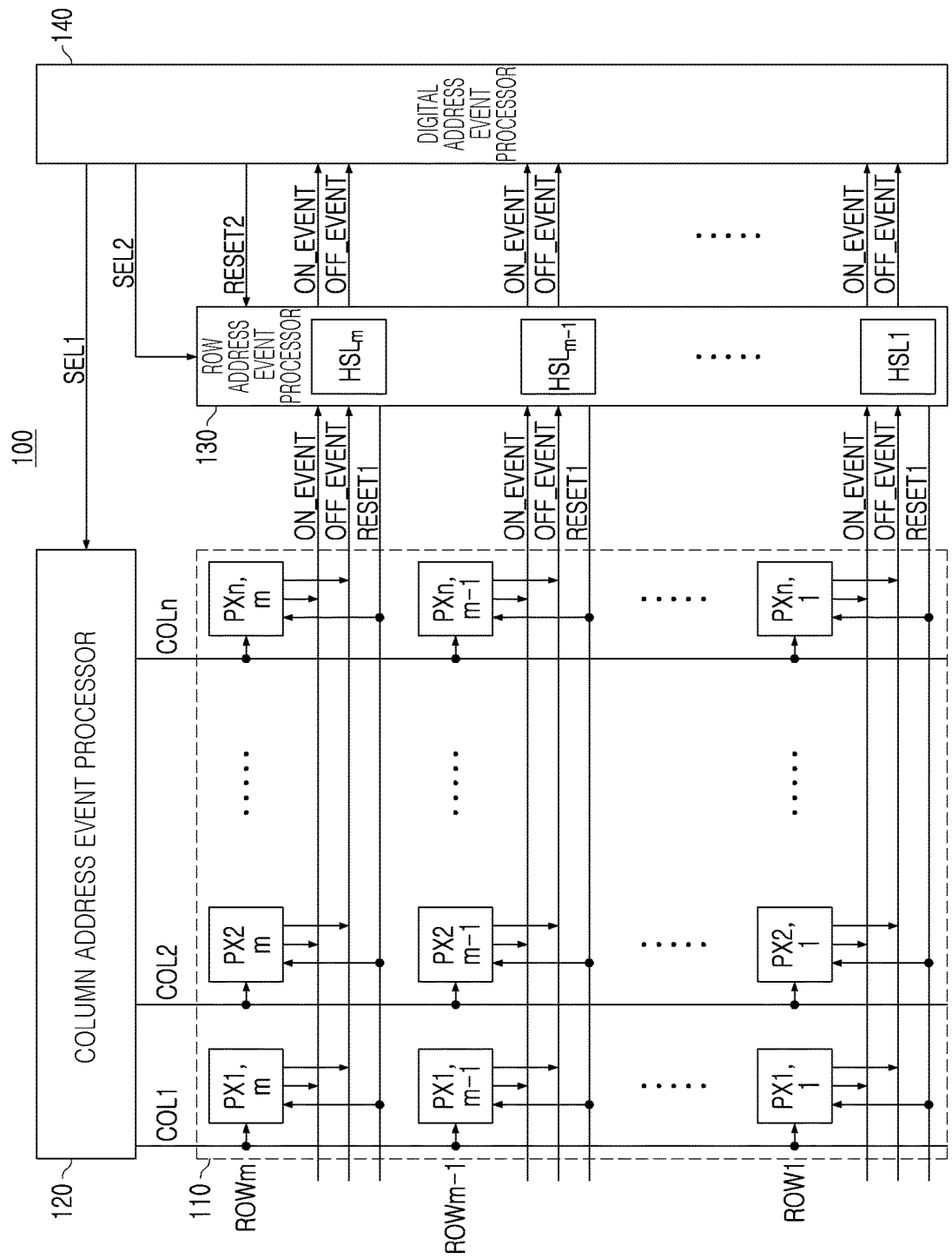
FIG. 1 is a diagram that illustrates a dynamic vision sensor system according to an example embodiment of the present disclosure.

Hereinafter, embodiments of the present disclosure will be described with reference to the accompanying drawings. Like reference symbols in the drawings may denote like elements, and to the extent that a description of an element has been omitted, it may be understood that the element is at least similar to corresponding elements that are described elsewhere in the specification. Additionally, description of a singular element may apply to a plurality of the same elements, unless the context of the description or referenced drawings indicates otherwise.

FIG. 1 is a diagram that illustrates a dynamic vision sensor system according to an example embodiment.

Referring to FIG. 1, a dynamic vision sensor system 100 may include a pixel array 110, address event processors 120 and 130, and a digital address event processor 140. The pixel array 110 may include a plurality of DVS pixels PX1,1-PXn,m which may sense an amount of change in light. For example, the plurality of DVS pixels PX1,1-PXn,m may sense an amount of change in light over time.

The pixel array 110 may include a plurality of row lines ROW1-ROWm extending in one direction and a plurality of column lines COL1-COLn intersecting the plurality of row lines ROW1-ROWm. The plurality of row lines ROW1-ROWm and the plurality of column lines COL1-COLn may be connected to the plurality of DVS pixels PX1,1-PXn,m.

The address event processors 120 and 130 may include a column address event processor 120 and a row address event processor 130. The column address event processor 120 and the row address event processor 130 may be implemented as separate blocks as shown in FIG. 1, or may be implemented in a single block.

The digital address event processor 140 may transmit a first selection signal SEL1 to the column address event processor 120. The first selection signal SEL1 may be used to select one of the plurality of column lines COL1-COLn included in the pixel array 110. For example, when the first column line COL1 is a selected column line, the first selection signal SEL1 may be input to the DVS pixels PX1,1-PX1,m connected to the first column line COL1 through the column address event processor 120. For example, the selection DVS pixels PX1,1-PX1,m may be simultaneously turned on in response to the first selection signal SEL1.

The digital address event processor 140 may transmit the second selection signal SEL2 to the row address event processor 130. The row address event processor 130 may receive signal(s) from at least one of the plurality of row lines ROW1-ROWm in response to the second selection signal SEL2. For example, the row address event processor 130 may obtain an event signal from at least a portion of the plurality of DVS pixels PX1,1-PXn,m in response to the second selection signal SEL2.

When the selected DVS pixels connected to the selected column line are simultaneously turned on by the first selection signal SEL1, each of the selected DVS pixels may output an ON event signal ON_EVENT or an OFF event signal OFF_EVENT to the row address event processor 300. For example, when the first column line COL1 is a selected column line, the selected DVS pixels PX1,1-PX1,m connected to the first column line COL1 may be simultaneously turned on. The turned-on selected DVS pixels PX1,1-PX1,m may output the ON event signal ON_EVENT or the OFF event signal OFF_EVENT to the row address event processor 130. For example, when the turned-on selected DVS pixels PX1,1-PX1,m from the first row are turned on, pixels that have observed a change in brightness higher than a predetermined reference value may output the ON event signal ON_EVENT. In example embodiments, when a change in brightness of light in at least one of the selected DVS pixels PX1,1-PX1,m is lower than a predetermined reference value, the corresponding DVS pixel may not output the ON event signal ON_EVENT or the OFF event signal OFF_EVENT.

The row address event processor 130 may obtain an ON event signal ON_EVENT or an OFF event signal OFF_EVENT from the selected DVS pixels connected to the selected column line. For example, when the first column line COL1 is a selected column line, the row address event processor 130 may obtain the ON event signal ON_EVENT or the OFF event signal OFF_EVENT from the selected DVS pixels PX1,1-PX1,m connected to the first column line COL1.

The row address event processor 130 may include hand-shaking logic HSL1-HSLm corresponding to the plurality of row lines ROW1-ROWm. For example, the first hand-shaking logic HSL1 may correspond to the first row line ROW1, the m−1th hand-shaking logic HSLm−1 may correspond to the m−1th row line ROWm−1, and the mth hand-shaking logic HSLm may correspond to the mth row line ROWm.

The hand-shaking logic HSL1-HSLm may obtain an ON event signal ON_EVENT or an OFF event signal OFF_EVENT from the selected DVS pixels connected to the selected column line. The hand-shaking logics HSL1-HSLm may transmit a first reset signal RESET1 to the selected DVS pixels in response to an event signal obtained from the selected DVS pixels. The first reset signal RESET1 may be used to reset the selected DVS pixels.

For example, when the first column line COL1 is a selected column line, the first hand-shaking logic HSL1 may obtain an event signal from the first selected DVS pixel PX1,1 connected to the first column line COL1 and may transmit a first reset signal RESET1 to the first selected DVS pixel PX1,1. The m−1th hand-shaking logic HSLm−1 may also obtain an event signal the m−1th selected DVS pixel PX1,m−1 connected to the first column line COL1, and may transmit the first reset signal RESET1 to the m−1th selected DVS pixel PX1,m−1. The mth hand-shaking logic HSLm may transmit the reset signal RESET1 to the mth selected DVS pixel PX1,m in response to an event signal received from the mth selected DVS pixel PX1,m connected to the first column line COL1.

The digital address event processor 140 may receive an event signal of the selected DVS pixels connected to the selected column line from the row address event processor 130. The digital address event processor 140 may transmit a second reset signal RESET2 to the row address event processor 130 in response to the event signal received from the row address event processor 130. The second reset signal RESET2 may be used to reset the row address event processor 130.

For example, when the first column line COL1 is a selected column line, the digital address event processor 140 may receive an event signal of the selected DVS pixels PX1,1-PX1,m connected to the first column line COL1 from the row address event processor 130.

The digital address event processor 140 may transmit a second reset signal RESET2 to the row address event processor 130 in response to the event signal received from the row address event processor 130. The row address event processor 130 may be reset by the second reset signal RESET2. When the row address event processor 130 is reset and the second column line COL2 is selected thereafter, the row address event processor 130 may receive an event signal from the DVS pixels PX2,1-PX2,m connected to the second column line COL2.

Figure 2:
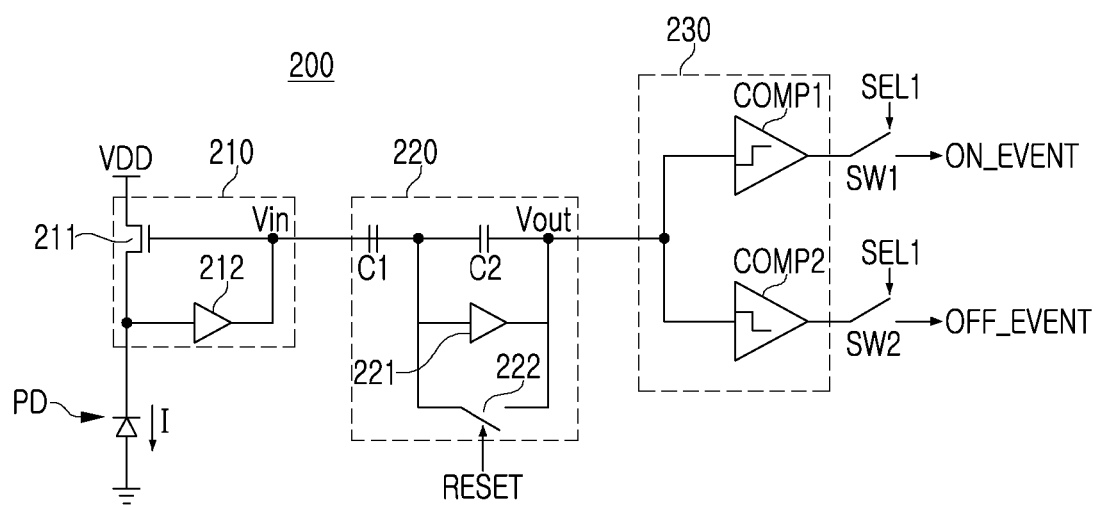
FIG. 2 is a diagram that illustrates a DVS pixel included in a dynamic vision sensor system according to an example embodiment of the present disclosure.

FIG. 2 is a diagram that illustrates a DVS pixel included in a dynamic vision sensor system according to an example embodiment.

Referring to FIG. 2, a DVS pixel 200 in an example embodiment may include a photodiode PD, a current/voltage converter 210, an amplifier circuit 220, a comparator circuit 230, a first switch SW1, and a second switch SW2. The photodiode PD is one implementation of a photoelectric conversion device, and may generate electric charges in response to light, such that a current I may flow.

The current/voltage converter 210 may include a conversion transistor 211 and a first amplifier 212. The conversion transistor 211 may be connected between the power supply voltage VDD and the photodiode PD, and the first amplifier 212 may amplify a voltage of the photodiode PD and may output a first voltage Vin. For example, the current/voltage converter 210 may sense the current I flowing due to electric charges generated by the photodiode PD and may output the first voltage Vin corresponding to the current I.

The amplifier circuit 220 may include a first capacitor C1, a second capacitor C2, a second amplifier 221, and a reset switch 222. The reset switch 222 may be activated in response to a reset control signal RESET received from the row address event processor, and may reset the second voltage Vout output by the amplifier circuit 220. By the reset operation as described above, the second voltage Vout may be reset to a constant voltage.

The amplifier circuit 220 may output a second voltage Vout related to the amount of change in the first voltage Vin over time based on the first voltage Vin. For example, the amplifier circuit 220 may amplify the first voltage Vin and may output a second voltage Vout to indicate a change in light intensity.

The comparator circuit 230 may include a first comparator COMP1 and a second comparator COMP2. The comparator circuit 230 may output an ON event signal ON_EVENT or an OFF event signal OFF_EVENT based on a change in the second voltage Vout. For example, the first comparator COMP1 may compare the second voltage Vout with an on-threshold voltage, and may generate an ON event signal ON_EVENT according to a result of the comparison. The second comparator COMP2 may compare the second voltage Vout with an off-threshold voltage and may generate an OFF event signal OFF_EVENT according to a result of the comparison. In one embodiment, unlike the one illustrated in FIG. 2, the comparator circuit 230 may compare against one threshold voltage to determine if the second voltage Vout is above or has moved above the threshold voltage and, if so, generate the ON event signal ON_EVENT. If the second voltage Vout is below or has moved below the threshold voltage, then the comparator circuit 230 may generate the OFF event signal OFF_EVENT.

The comparator circuit 230 may generate an ON event signal ON_EVENT or an OFF event signal OFF_EVENT when the change in intensity of light incident to the DVS pixel 200 is equal to or greater than a predetermined reference range. For example, the ON event signal ON_EVENT may have a high logic value when brightness of light incident to the DVS pixel 200 increases beyond a reference range. The OFF event signal OFF_EVENT may have a high logic value when brightness of light incident to the DVS pixel 200 decreases by the reference range or more.

The DVS pixel 200 may receive the first selection signal SEL1 from the digital address event processor through the column address event processor. The first switch SW1 and the second switch SW2 may be turned on in response to the first selection signal SEL1. When the first switch SW1 and the second switch SW2 are turned on in response to the first selection signal SELL, the generated ON event signal ON_EVENT or the OFF event signal OFF_EVENT may be output to the row address event processor.

For example, when brightness of light incident to the DVS pixel 200 increases beyond the reference range, the DVS pixel 200 may output the ON event signal ON_EVENT to the row address event processor through the first switch SW1 turned on in response to the first selection signal SELL. When brightness of the light incident to the DVS pixel 200 is reduced by the reference range or more, the DVS pixel 200 may output the OFF event signal OFF_EVENT to the row address event processor through the second switch SW2 turned on in response to the second selection signal SEL2. When the change in brightness of light incident to the DVS pixel 200 is less than the reference range, the DVS pixel 200 may not output the ON event signal ON_EVENT or the OFF event signal OFF_EVENT.

After the comparator circuit 230 outputs the ON event signal ON_EVENT or the OFF event signal OFF_EVENT, the amplifier circuit 220 of the DVS pixel 200 may receive a reset signal RESET from the row address event processor. The second voltage Vout output by the amplifier circuit 220 may be reset by the reset signal RESET.

Figure 3:
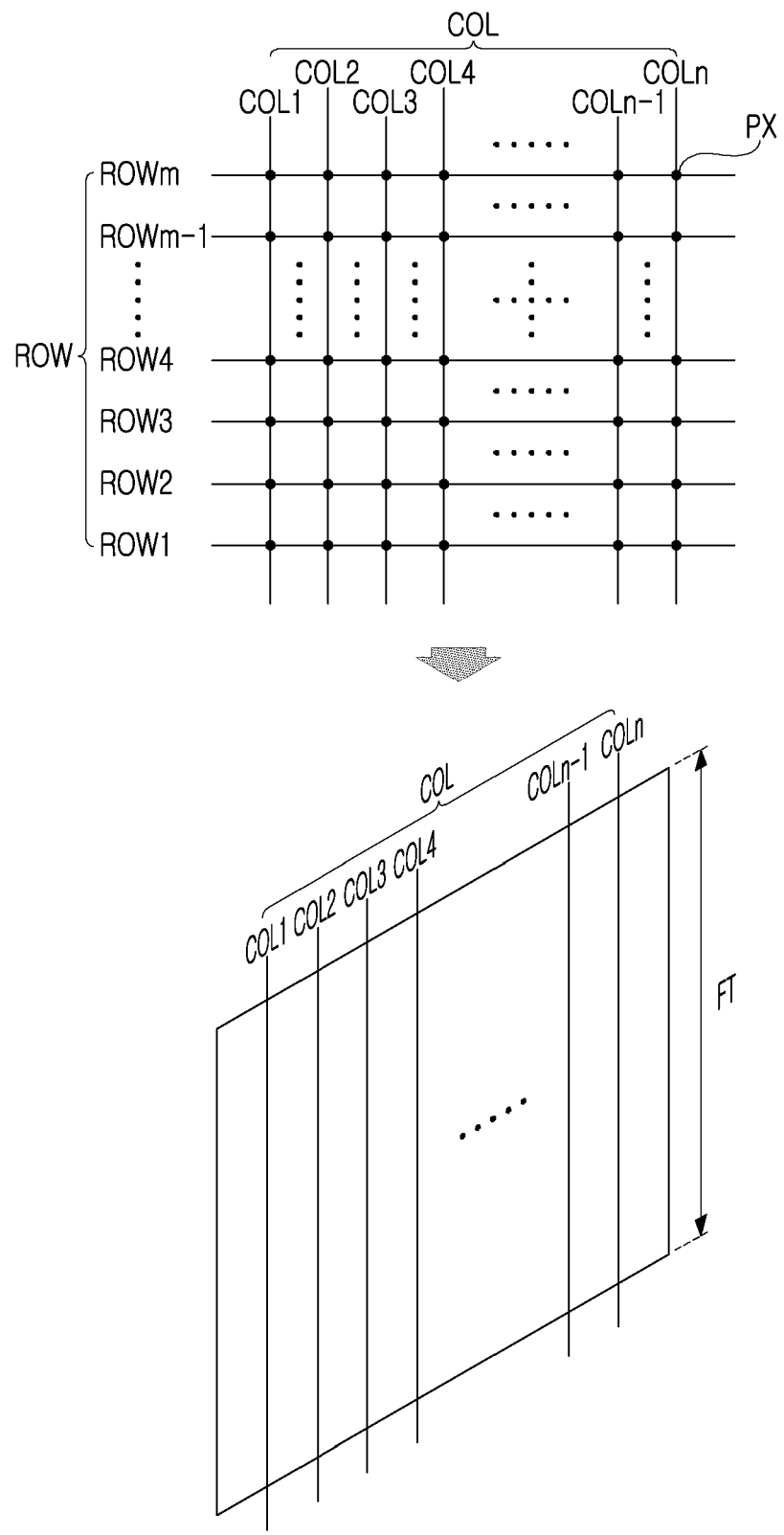
FIG. 3 is a diagram that illustrates operations of a dynamic vision sensor system according to an example embodiment of the present disclosure.

FIG. 3 is a diagram that illustrates operations of a dynamic vision sensor system according to an example embodiment.

Referring to FIG. 3, the dynamic vision sensor system in an example embodiment may include a plurality of DVS pixels PX. The plurality of DVS pixels PX may be connected to a plurality of row lines ROW1-ROWm (ROW) and a plurality of column lines COL1-COLn (COL). In an example embodiment, the dynamic vision sensor system may drive the plurality of DVS pixels PX in units of a plurality of column lines COL. For example, a selected column line may be driven among the plurality of column lines COL and an event signal may be obtained from all the DVS pixels PX connected to the selected column line simultaneously. A time required to obtain an event signal from the DVS pixels PX connected to one of the selected column line may be defined as a horizontal period.

A frame period FT of the dynamic vision sensor system may be defined as a time required to read an event signal from the entire plurality of DVS pixels PX one time. For example, the frame period FT may be equal to or greater than the number of the plurality of column lines COL multiplied by the horizontal period. The shorter the frame period FT, the more data the dynamic vision sensor system may generate over a certain period of time.

Figure 4:
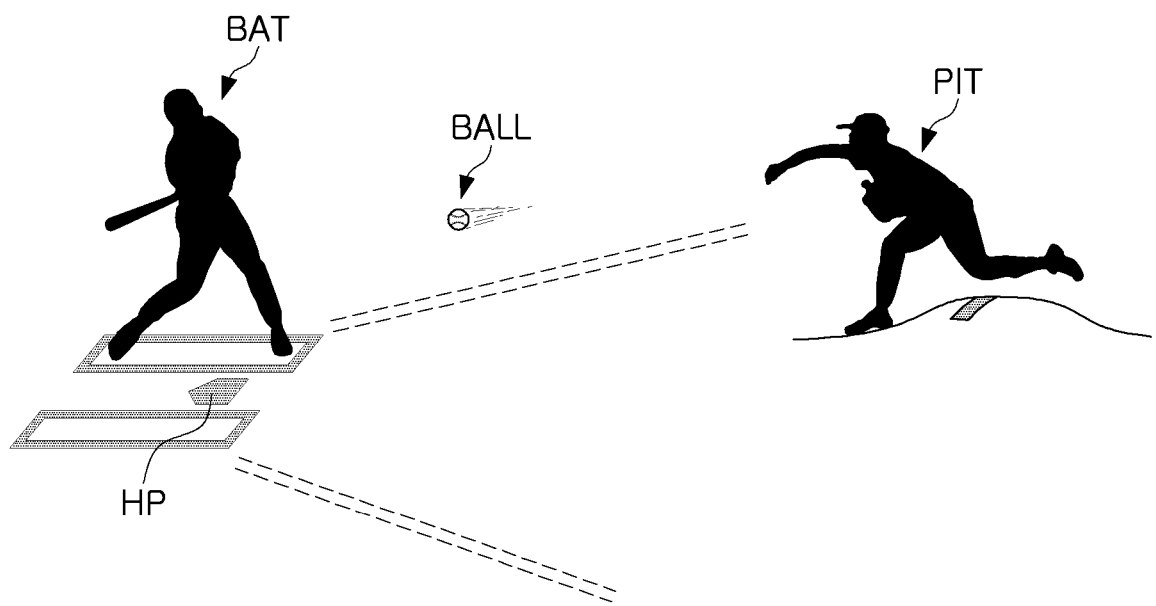
FIG. 4 is a diagram that illustrates an example of application of a dynamic vision sensor system according to an example embodiment of the present disclosure.

FIG. 4 is a diagram that illustrates an example of application of a dynamic vision sensor system according to an example embodiment.

Referring to FIG. 4, the dynamic vision sensor system in an example embodiment may be applied to tracking movement of a ball thrown by a pitcher PIT. The dynamic vision sensor system may be installed in view of a path through which a ball thrown by a pitcher PIT passes. For example, the dynamic vision sensor system may be installed near a plate where a batter BAT is present or on a home plate HP.

As illustrated in FIG. 4, the dynamic vision sensor system installed in a baseball stadium may be used to determine a strike zone. Additionally or alternatively, by installing the dynamic vision sensor system in a space for practice games or pitching/batting, the pitch and speed of the ball thrown by the pitcher PIT may be analyzed and the analysis may be applied to training.

However, applications of the dynamic vision sensor system from the present disclosure are not limited to baseball. The dynamic vision sensor system in an example embodiment may swiftly and accurately track the movement of an object while roughly recognizing the shape and size of the object, such that the system may be used for in/out determination in sports other than baseball. Also, the dynamic vision sensor system in an example embodiment may be applied to various fields requiring tracking of a moving object, such as, for example, tracking of an unmanned aerial vehicle, quality control in manufacturing, wildlife tracking, and others, as well as sports games.

Figure 5:
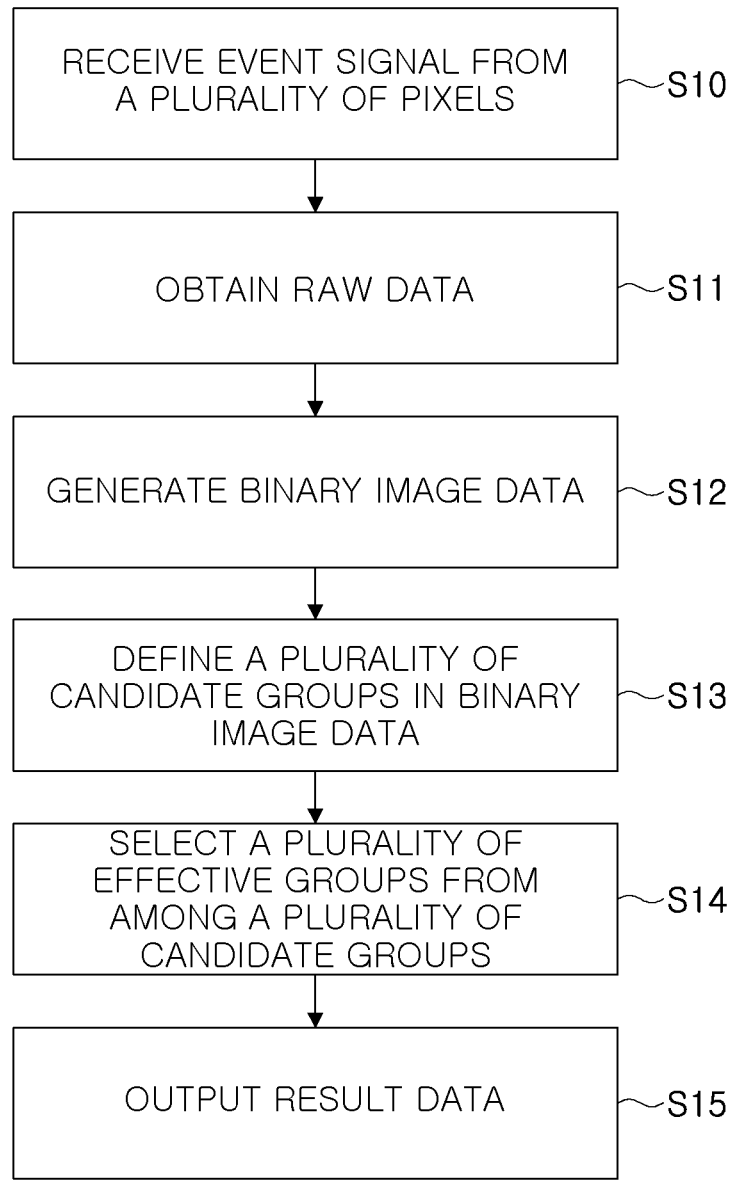
FIG. 5 is a diagram that illustrates a method of operating a dynamic vision sensor system according to an example embodiment of the present disclosure.

FIG. 5 is a diagram that illustrates a method of operating a dynamic vision sensor system according to an example embodiment.

Referring to FIG. 5, the method of operating a dynamic vision sensor system in an example embodiment may start with receiving an event signal from a plurality of DVS pixels disposed in a pixel array (S10). For example, as described above with reference to FIGS. 1 to 3, the dynamic vision sensor system may include an address event processor connected to the pixel array, and the address event processor may drive the pixel array in units of row lines or column lines and may receive an event signal from a plurality of DVS pixels. Among the plurality of DVS pixels, at least a portion of the DVS pixels sensing a change in light brightness greater than a predetermined reference range may output an ON event signal or an OFF event signal. For example, some of the plurality of DVS pixels may output an ON event signal when they sense an increase in light greater than one threshold. Some of the plurality of DVS pixels may output an OFF event signal when they sense a decrease in light greater than another threshold.

When an event signal is received from a plurality of pixels, the dynamic vision sensor system may obtain raw data (S11). For example, the raw data may be configured as image data obtained by matching or mapping an event signal received from the plurality of DVS pixels to a two-dimensional plane corresponding to the plurality of DVS pixels. For example, the raw data represented as image data may include a plurality of image pixels corresponding to a plurality of DVS pixels, and a pixel value of each of the plurality of image pixels may be determined according to an event signal output by each of the plurality of DVS pixels.

For example, when an object moves within a sensing range of the dynamic vision sensor system while the dynamic vision sensor system operates, at least a portion of the plurality of DVS pixels may output an event signal along a trajectory of the object. For example, when it is assumed that the object moves from a first point to a second point with reference to a sensing time point (e.g., including or determined by an operation speed of the dynamic vision sensor system) at which a change in brightness of light is sensed, a DVS pixel corresponding to the first point may sense an increase in brightness of light, and a DVS pixel corresponding to the second point may sense a decrease in brightness of the light. Accordingly, in the raw data, at least one image pixel corresponding to the first point may represent an increase in brightness of light, and at least one other image pixel corresponding to the second point may represent a decrease in brightness of light. In an example embodiment, the image pixel corresponding to the first point and the image pixel corresponding to the second point may have pixel values of different polarities.

Thereafter, the dynamic vision sensor system may generate binary image data using the raw data (S12). The binary image data may be data generated by binarizing a pixel value of each of a plurality of image pixels included in the raw data. For example, when a maximum pixel value of each of the plurality of image pixels is defined as a first pixel value and a minimum pixel value is defined as a second pixel value, by changing the pixel value of each of the plurality of image pixels to the first pixel value or the second pixel value according to a predetermined criterion in the raw data such as determining whether the pixel value is above or below a threshold value, or equals or does not equal, binary image data may be generated.

For example, when the dynamic vision sensor system senses a continuously moving object and outputs raw data, one original image data may be generated by accumulating raw data obtained during a period of time having several frame cycles. Each of the DVS pixels corresponding to the trajectory of the moving object may sense an increase and a decrease in brightness of light one time, and may output an ON event signal and an OFF event signal one time. Accordingly, image pixels corresponding to the trajectory of the moving object in the original image data may have the same pixel value.

For example, the pixel value of the image pixel corresponding to the DVS pixel to which the ON event signal and the OFF event signal are output one time (e.g., during the period of time with several frame cycles) may be 2. The pixel value of the image pixel based on the number of event signals output by the corresponding DVS pixel may be referred to as a DVS pixel value. In the original image data, an image pixel having a pixel value of 2 may have a first pixel value, and an image pixel having a different pixel value may be binarized so as to have a second pixel value, thereby generating binary image data. Through the binarization as described above, data from noise, rather than the object, may be filtered out.

Thereafter, a plurality of candidate groups may be defined in the binary image data (S13). In an example embodiment, a plurality of candidate groups may be defined by grouping image pixels included in binary image data. Since each of the image pixels in the binary image data has a first pixel value or a second pixel value, in one embodiment, two or more image pixels having a first pixel value and adjacent to each other may be grouped and may be defined as a candidate group. In some embodiments, there may be a different threshold number of adjacent pixels with the first pixel value, such as 1, 5, or 10, to qualify as a candidate group.

When a plurality of candidate groups are defined, the dynamic vision sensor system may select a plurality of effective groups representing the object from the plurality of candidate groups based on a shape and/or the trajectory of the object (S14). Image pixels corresponding to the DVS pixels sensing a change in brightness of light caused by movement of the object may be binarized to have the first pixel value in operation S12, and accordingly, the plurality of candidate groups may indicate an instantaneous position of the object.

However, unfiltered noise may be present in the binarization operation, and accordingly, a plurality of effective groups may be selected from a plurality of candidate groups according to the shape and the trajectory of the object. In some cases, when no noise is present, an entirety of the plurality of candidate groups may be selected as the plurality of effective groups. For example, the dynamic vision sensor system may not select a candidate group having too many or too few pixels as an effective group by comparing the number of image pixels included in each of the plurality of candidate groups. Alternatively, the shape may be determined using image pixels included in each of the plurality of candidate groups, and a candidate group having a shape different from that of other candidate groups may not be selected as an effective group. Also, outlier(s) may be removed from the plurality of candidate groups by applying a RANdom sample consensus (RANSAC) model to the plurality of candidate groups, and a plurality of effective groups may be selected.

The dynamic vision sensor system may output result data indicating the trajectory of the object using the plurality of effective groups selected in operation S14 (S15). The result data may include the trajectory of the object determined from the plurality of effective groups, and also the speed of movement of the object determined with reference to the frame period of the dynamic vision sensor system.

FIGS. 6A to 6D are diagrams that illustrate operations of a dynamic vision sensor system according to an example embodiment.

FIGS. 6A to 6D illustrate raw data generated by the dynamic vision sensor system according to a frame period. The raw data generated by the dynamic vision sensor system in one time of frame period may be image data (e.g., from a sequence of image frames) converted into video. As illustrated in FIGS. 6A to 6D, as the frame period increases, the dynamic vision sensor system may generate more image data by collecting more raw data within the same period of time.

Figure 6A:
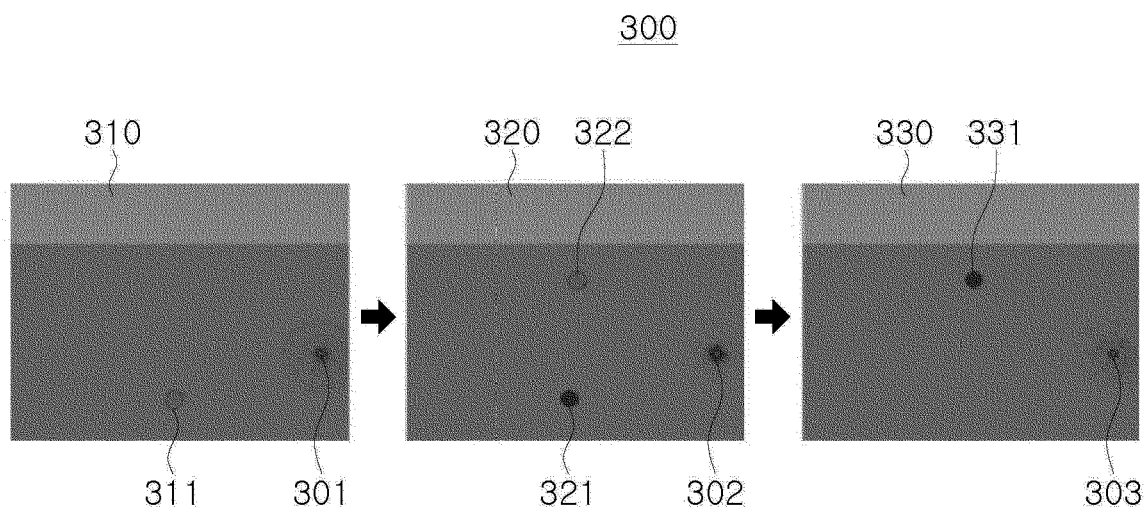
FIGS. 6A to 6D are diagrams that illustrate operations of a dynamic vision sensor system according to an example embodiment of the present disclosure.

In an example embodiment illustrated in FIG. 6A, the dynamic vision sensor system may operate in a first frame period. The raw data 300 output by the dynamic vision sensor system for a predetermined period of time may include first to third image data 310 to 330 generated in sequence.

Referring to the first image data 310, effective data by the movement of the object may be represented in a first area 311. Also, noise data may be represented in a first noise area 301, and the noise data may correspond to an event signal caused by a change in brightness of light generated by another object unrelated to the object (e.g., from a light source, or another object unrelated to the object salient for tracking). The object may be present in the first area 311 at a first time point at which an event signal corresponding to the first image data 310 is generated, and accordingly, image pixels disposed in the first area 311 may have a pixel value corresponding to a decrease in brightness of light. For example, the object may register as darker than a background scene, such as a ball flying through the bright sky.

Thereafter, referring to the second image data 320, effective data due to the movement of an object may be represented in the first area 321 and the second area 322. The first area 321 of the second image data 320 may be the same position as the first area 311 of the first image data 310. For example, the object may be present in the first area 311 at a first time point at which an event signal corresponding to the first image data 310 is generated, and the object may move to the second area 322 at a second time point at which an event signal corresponding to the second image data 320 is generated.

Accordingly, in the second image data 320, image pixels disposed in the first area 321 may have a pixel value corresponding to an increase in brightness of light, which may indicate that the object originally in the first area 321 has left the first area 321, and image pixels disposed in the second area 322 may have a pixel value corresponding to a decrease in brightness of light, indicating that the object has moved to the second area 322. Also, in the second image data 320, noise data may be represented by image pixels disposed in the first noise region 302.

Thereafter, referring to the third image data 330, effective data by the movement of the object may be represented in the first area 331. The first area 331 of the third image data 330 may be the same position as that of the second area 321 of the second image data 320. For example, the object may be present in the second area 321 at a second time point at which an event signal corresponding to the second image data 320 is generated, and the object may move out of the first area 331 to another position at a third time point at which the event signal corresponding to the third image data 330 is generated. Accordingly, image pixels disposed in the first area 331 in the third image data 330 may have a pixel value corresponding to an increase in brightness of light, indicating that the object was once in the second area 322 and then has left. Noise data may be represented by image pixels disposed in the first noise area 302 in the second image data 320 as well.

Figure 6B:
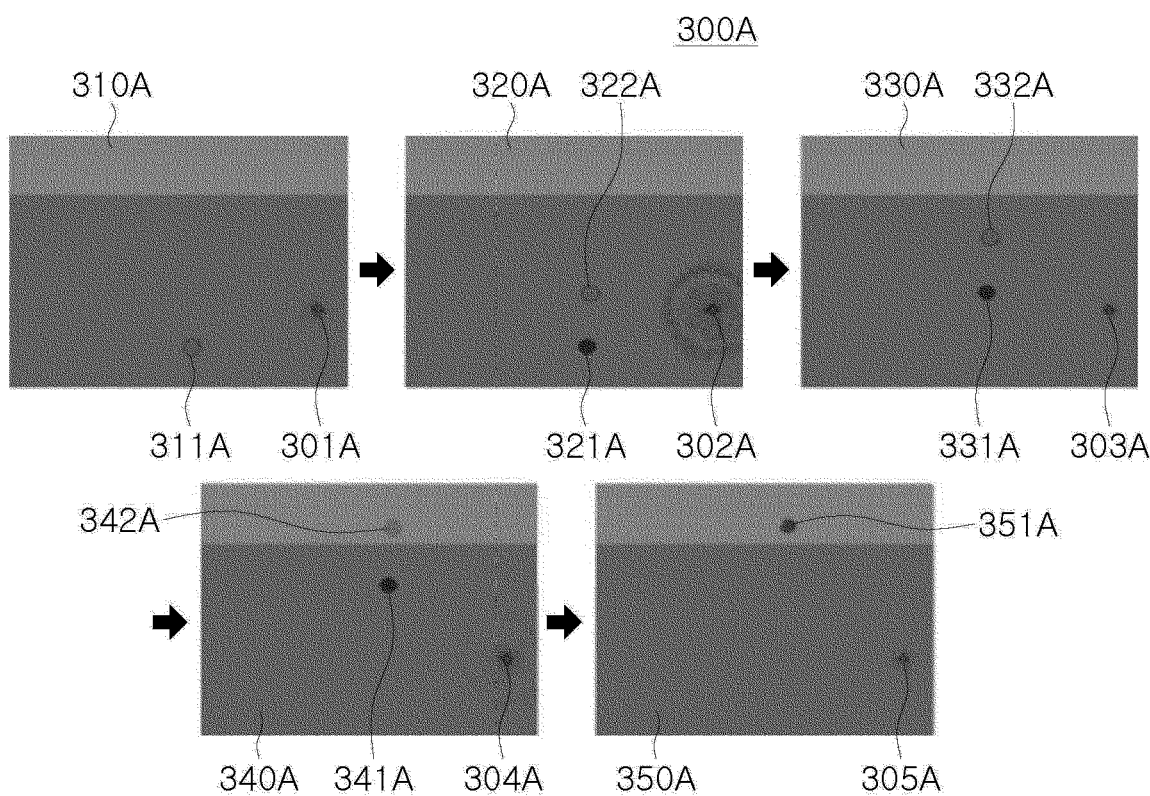

In the example embodiment illustrated in FIG. 6B, the dynamic vision sensor system may operate with a second frame period which may be earlier than the first frame period. The raw data 300A output by the dynamic vision sensor system for the same period of time as in the example embodiment illustrated in FIG. 6A may include first to fifth image data 310A-350A generated in sequence (e.g., 5 frames within the time period instead of 3). For example, the raw data 300A may be data obtained by sensing an object as in the example embodiment described with reference to FIG. 6A.

Referring to the first image data 310A, image pixels disposed in the first area 311A may have a pixel value corresponding to a decrease in brightness of light. Image pixels disposed in the first noise area 301A may have a pixel value corresponding to an increase in brightness of light, and may represent noise data caused by a different object. The first image data 310A may be the same as the first image data 310 described with reference to FIG. 6A.

Thereafter, referring to the second image data 320A, the image pixels of the first area 321A may have a pixel value corresponding to an increase in brightness of light, and the image pixels of the second area 322A may have a pixel value corresponding to a decrease in brightness. Similar as before, this may indicate than an object has moved from the first area 321A to the second area 322A. The first area 321A of the second image data 320A may be the same position as the first area 311A of the first image data 310A. For example, during a period of time between a first time point at which an event signal corresponding to the first image data 310A is generated and a second time point at which an event signal corresponding to the second image data 320A is generated, the object may move from the first area from 321A to the second area 322A.

Similarly, in the third image data 330A, image pixels of the first area 331A may have a pixel value corresponding to an increase in light brightness, and image pixels of the second area 332A may have a pixel value corresponding to a decrease in light brightness. Similarly, in the fourth image data 340A, image pixels of the first area 341A may have a pixel value corresponding to an increase in light brightness, and image pixels of the second area 342A may have a pixel value corresponding to a decrease in light brightness. Lastly, in the fifth image data 350A, image pixels disposed in the first area 351A may have a pixel value corresponding to an increase in brightness of light, again indicting that the object has left the first area 351A for a new position.

Figure 6C:
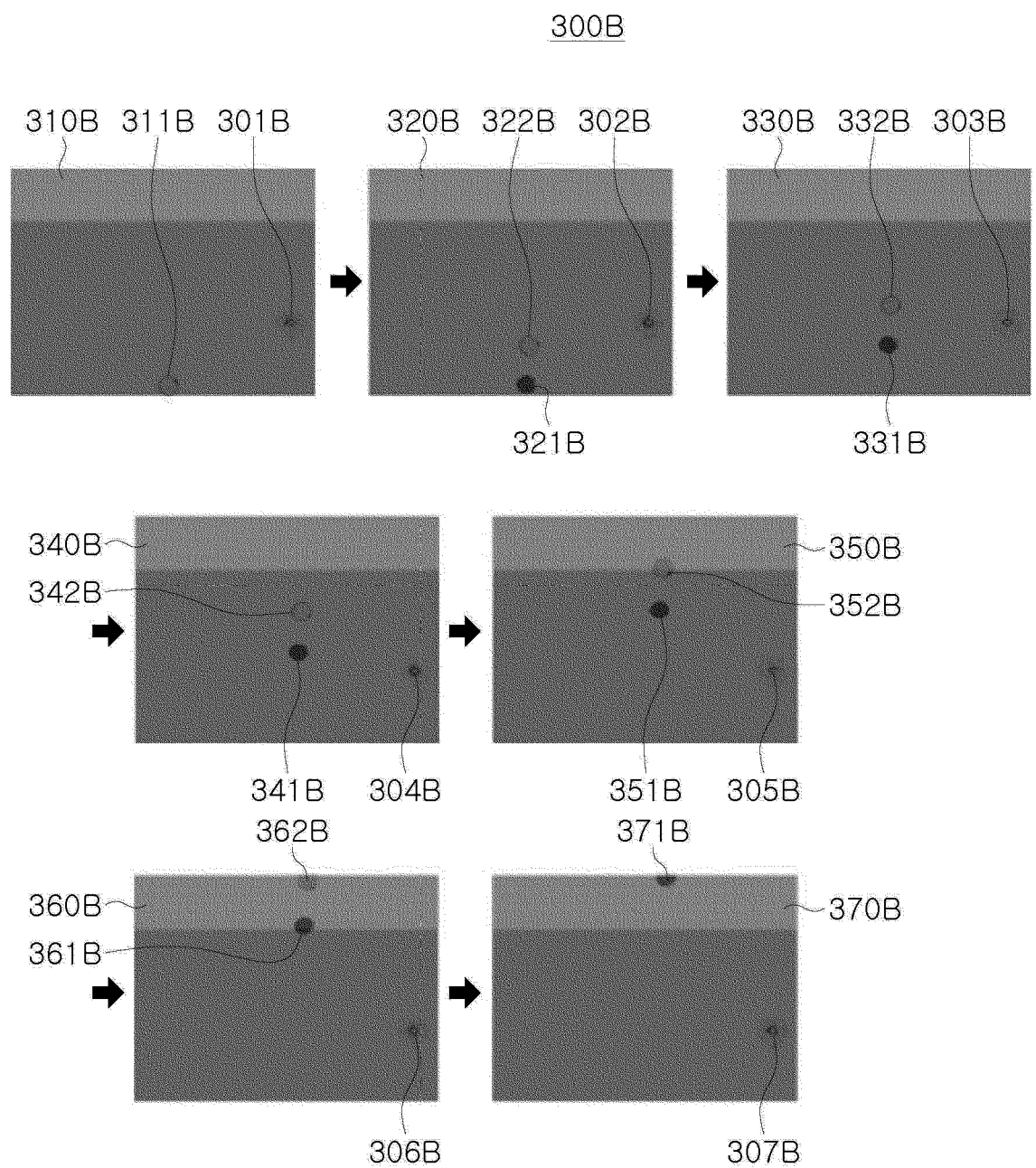

In the example embodiment illustrated in FIG. 6C, the dynamic vision sensor system may sense an object as in the example embodiments described with reference to FIGS. 6A and 6B with a third frame period earlier than the second frame period. The raw data 300B output by the dynamic vision sensor system for the same period of time as in the example embodiment illustrated in FIG. 6C may include first to seventh image data 310B-370B generated in sequence.

Referring to the first image data 310B, image pixels disposed in the first area 311B may have a pixel value corresponding to a decrease in brightness of light. Image pixels disposed in the first noise area 301B may have a pixel value corresponding to an increase in brightness of light, and may represent noise data due to an object different from the object.

Thereafter, referring to each of the second to sixth image data 320B-360B, image pixels of the first area 321B-361B may have a pixel value corresponding to an increase in brightness of light, and image pixels of the second area 322B-362B may have a pixel value corresponding to a decrease in brightness of light. The object may move from the first areas 321B-361B to the second areas 322B-362B between time points at which event signals corresponding to the second to sixth image data 320B-360B is generated.

For example, each of the second to sixth image data 320B-360B may represent an object moving from the first area 321B-361B to the second area 322B-362B. In the seventh image data 370B, image pixels disposed in the first area 371B may have a pixel value corresponding to an increase in brightness of light.

Figure 6D:
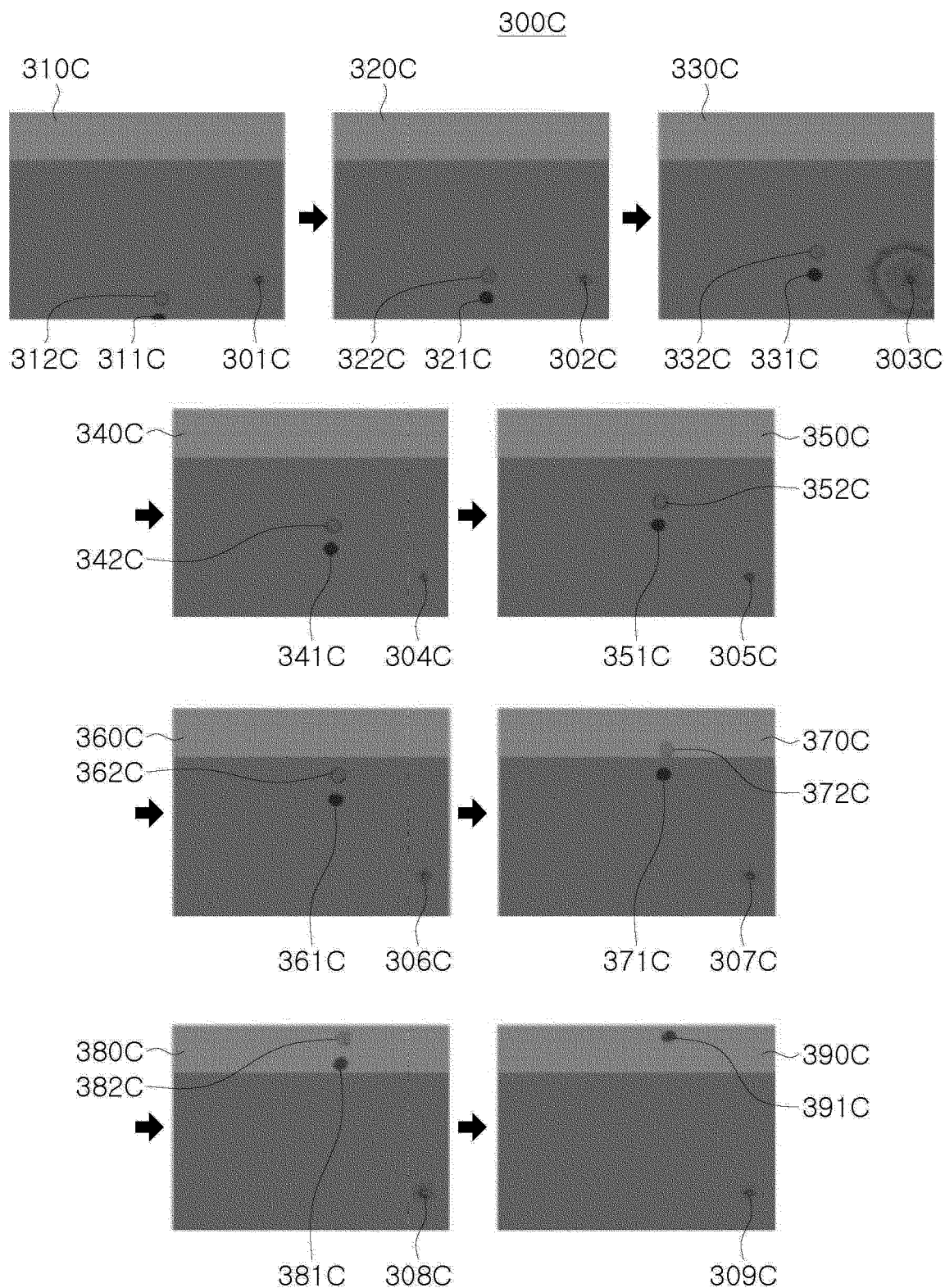

In the example embodiment illustrated in FIG. 6D, the dynamic vision sensor system may sense an object as in the example embodiments described with reference to FIGS. 6A to 6C with a fourth frame period earlier than the third frame period. The raw data 300C output by the dynamic vision sensor system for the same period of time as in the example embodiment illustrated in FIG. 6D may include first to seventh image data 310C-370C generated in sequence.

Referring to the first image data 310C, image pixels disposed in the first area 312C may have a pixel value corresponding to a decrease in brightness of light. Image pixels disposed in the first noise area 301C may have a pixel value corresponding to an increase in brightness of light, and may represent noise data caused by an object different from the object.

Thereafter, referring to each of the second to eighth image data 320C-360C, image pixels of the first area 321C-381C may have a pixel value corresponding to an increase in brightness of light, and image pixels in the second area 322C-382C may have a pixel value corresponding to a decrease in brightness of light. The object may move from the first area 321C-381C to the second area 322C-382C between time points at which an event signal corresponding to the second to eighth image data 320C-380C is generated.

For example, each of the second to eighth image data 320C-380C may represent an object moving from the first area 321C-381C to the second area 322C-382C. In the ninth image data 390C, image pixels disposed in the first area 391C may have a pixel value corresponding to an increase in brightness of light, indicating that the object has left the first area 391C and moved to another location (e.g., out of the view of the sensor).

The dynamic vision sensor system may generate one original image data by accumulating image data included in each piece of raw data 300-300C. In the original image, pixel values of each of the image pixels included in the raw data 300-300C may be accumulated and exhibited. Hereinafter, the configuration will be described in greater detail with reference to FIGS. 7 to 9.

Figure 7:
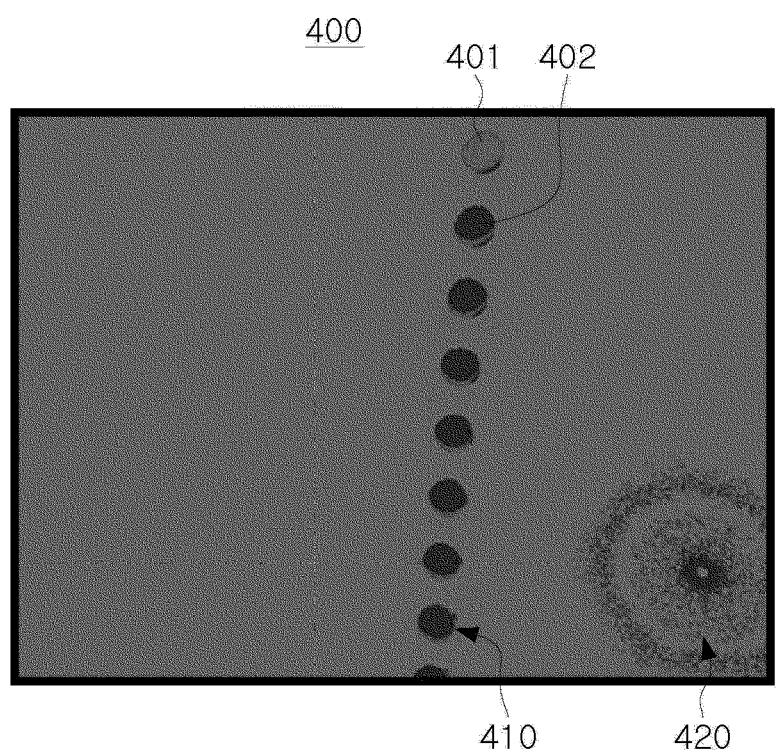
FIGS. 7 to 9 are diagrams that illustrate raw image data generated by a dynamic vision sensor system according to an example embodiment of the present disclosure.
Figure 8:
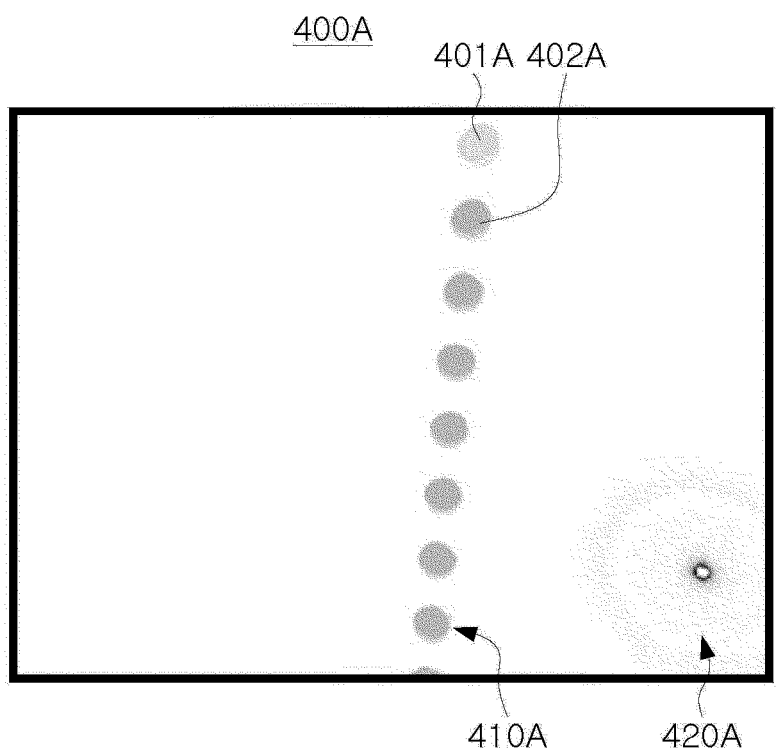
Figure 9:
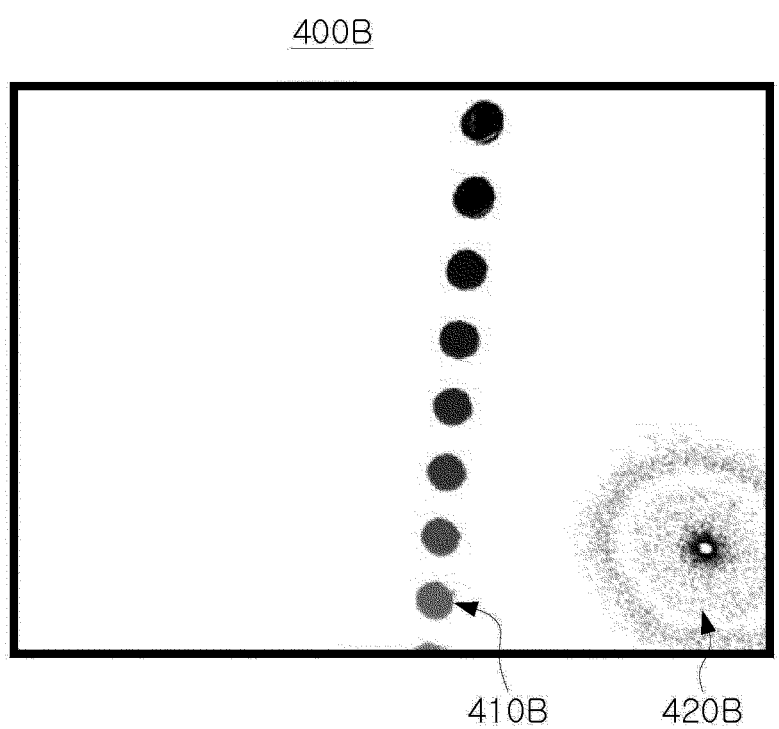

FIGS. 7 to 9 are diagrams that illustrate raw image data generated by a dynamic vision sensor system according to an example embodiment.

In the example embodiments illustrated in FIGS. 7 to 9, the dynamic vision sensor system may combine first to ninth image data 310C-390C according to the example embodiment described above with reference to FIG. 6D and may generate a single piece of original image data (e.g., a single image).

Referring to FIG. 7, the dynamic vision sensor system may generate original image data 400 by combining the first to ninth image data 310C-390C. Accordingly, the original image data 400 may include a plurality of effective areas 410 appearing along the movement of an object and a noise area 420 corresponding to noise. In some cases, it will be appreciated that there is no noise area 420. A pixel value of each of the image pixels in the original image data 400 according to the example embodiment illustrated in FIG. 7 may be determined according to a polarity (e.g., a binary high or low value) of the event signal finally output by each of the DVS pixels.

Accordingly, as illustrated in FIG. 7, image pixels disposed in the latest position 401 in which the object was last sensed may have a pixel value of a first polarity corresponding to a decrease in brightness of light. Image pixels disposed in a past position 402 where the object has passed by may have a pixel value of a second polarity corresponding to an increase in brightness of light. The first polarity and the second polarity may be opposite to each other (e.g., may be opposite binary values). In each of the first to ninth image data 310C-390C, the image pixels disposed in the noise area 301C-309C may only sense an increase in brightness of light, and accordingly, the noise area 420 may have a pixel value of the second polarity as illustrated in FIG. 7.

Thereafter, the pixel value of each of the image pixels in the original image data 400A according to the example embodiment illustrated in FIG. 8 may be determined according to the number of times by which each of the DVS pixels has output an event signal while obtaining the first to ninth image data 310C-390C. Also, the original image data 400A may include a plurality of effective areas 410A appearing along the movement of the object, and a noise area 420A corresponding to noise.

DVS pixels corresponding to image pixels in the latest position 401A in which the object has last sensed may output an event signal one time. DVS pixels corresponding to image pixels in the past position 402 passed by the object may output the event signal twice, and may indicate the object entered that position at one time step and then left the position and the next time step. Defining that the number of times the DVS pixel outputs an event signal to be the pixel value of the image pixel, the pixel value of each of the image pixels in the latest position 401A may be 1, and the pixel value of each of the image pixels in the past position 402 may be 2. However, in some example embodiments, when the original image data 400A includes image data up to the time point at which the object moves from the latest position 401A, e.g., to a position out of view of the sensor, each of the image pixels in the latest position 40A may have a pixel value of 2.

In each of the first to ninth image data 310C-390C, the image pixels in the noise area 301C-309C may have a pixel value corresponding to the number of times by which the DVS pixels has output an event signal by sensing a change in brightness of light caused by noise. Accordingly, at least a portion of the image pixels of the noise areas 301C-309C may have a pixel value greater than 2.

Thereafter, the pixel value of each of the image pixels in the original image data 400A according to the example embodiment illustrated in FIG. 9 may be determined by a time stamp indicating a time point at which the event signal has been last output by each of the DVS pixels while obtaining first to ninth image data 310C-390C across a predetermined time period. The original image data 400B may include a plurality of effective areas 410B appearing along the movement of the object and a noise area 420B corresponding to noise.

A time stamp may vary according to a time point at which each of the DVS pixels corresponding to the image pixels of each of the effective areas 410B finally outputs an event signal (e.g., a time point for each DVS pixel corresponding to the past time the pixel output an event signal). Accordingly, as illustrated in FIG. 9, shades of the effective areas 410B may be represented by different densities depending on the movement of the object. In the example embodiment illustrated in FIG. 9, the more recent the time stamp, the darker the density of image pixels may be represented.

The dynamic vision sensor system in an example embodiment may generate original image data as described with reference to FIGS. 7 to 9 and may determine the movement of an object based on the generated original image data. First, before the movement of an object is determined, binary image data may be generated by binarizing the original image data, and noise may be filtered from the binary image data based on the shape and size of the object. In some cases, binarizing the original image data generates 1) pixel values corresponding to a decrease in brightness and 2) pixel values corresponding to an increase in brightness, but may further keep 3) pixel values corresponding to no change in brightness, which may be represented as a different color than the other two pixel values, such as a white background color. In other cases, binarizing generates only two pixel values, for example, a first pixel value corresponding to pixels a DVS event count of 2, and second pixel value corresponding to pixels with a DVS event count of any number other than 2, such as PX1 and PX2 described with reference to FIG. 13. Accordingly, a trajectory according to the movement of an object may be swiftly and accurately determined regardless of the frame period of the dynamic vision sensor system.

Figure 10:
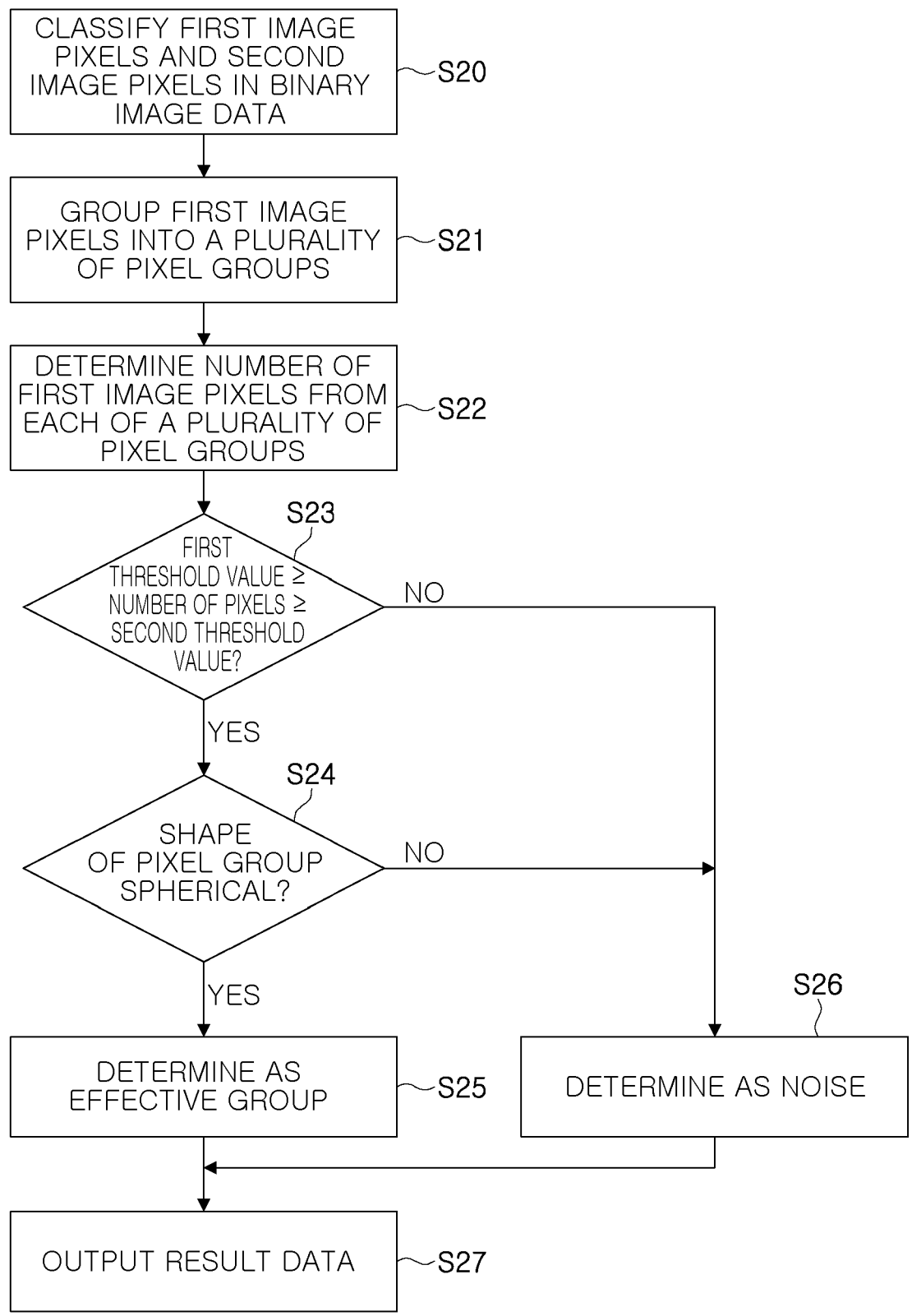
FIG. 10 is a diagram that illustrates a method of operating a dynamic vision sensor system according to an example embodiment of the present disclosure.

FIG. 10 is a diagram that illustrates a method of operating a dynamic vision sensor system according to an example embodiment.

Referring to FIG. 10, operations of the dynamic vision sensor system in an example embodiment may start by distinguishing first image pixels and second image pixels in binary image data (S20). The binary image data may be generated by binarizing the original image data described above with reference to FIGS. 7 to 9.

For example, the original image data 400A according to the example embodiment illustrated in FIG. 8 may include a plurality of effective areas 410A according to the movement of an object and a noise area 420A corresponding to noise. As described above, each of the image pixels included in the plurality of effective areas 410A may have a pixel value of 2. For example, in the original image data 400A, a first pixel value which may be a maximum pixel or a high pixel value may be allocated to each of the image pixels having a pixel value of 2, and a second pixel value which may be a minimum pixel value or a low pixel value is allocated to each of the image pixels having a pixel value other than 2 in the original image data 400A.

Accordingly, the binary image data may include first image pixels having a first pixel value and second image pixels having a second pixel value. In the binary image data, the first image pixels may be disposed in positions representing the movement of the object, and the second image pixels may be disposed in positions that are independent of or unrelated to the movement of the object. However, in some cases, since at least one image pixel having a pixel value of 2 may be present even in the noise area of the original image data, at least one of the first image pixels may be disposed in a position independent of the movement of the object.

The dynamic vision sensor system may group the first image pixels into a plurality of pixel groups (S21) and may determine the number of image pixels in each of the plurality of pixel groups (S22). For example, two or more first image pixels adjacent to each other among the first image pixels may be grouped into a pixel group, though this threshold number may be variously changed according to embodiments.

As described above, among the image pixels present in the noise area of the original image data, an image pixel binarized into the first image pixel may be present. However, when at least one of the image pixels of the noise area is binarized into the first image pixel, the result of grouping may be different from the image pixels binarized into the first image pixel in the effective areas related to the movement of the object. In an example embodiment, the number of first image pixels included in each of the pixel groups corresponding to the effective areas may be significantly different from the number of first image pixels included in the at least one pixel group corresponding to the noise area. In this way, the pixel groups corresponding from the effective areas may be distinguished from any pixel groups corresponding to noise.

The dynamic vision sensor system may compare the number of first image pixels included in each of the plurality of pixel groups with a first threshold value and a second threshold value (S23). In an example embodiment, the first threshold value and the second threshold value may be upper and lower limits determined for the number of first image pixels included in each of the effective groups representing the movement of the object among pixel groups in the binary image data. The first threshold value and the second threshold value may be determined according to a size of the object, a distance between the dynamic vision sensor system and the object, a focal length of the dynamic vision sensor system, and the like.

However, in example embodiments, the number of first image pixels included in each of the plurality of pixel groups may not be compared with the first threshold value and the second threshold value, and the numbers of first image pixels included in the plurality of pixel groups may be compared with each other. For example, when the first to fifth pixel groups are present in the binary image data, the numbers of first image pixels included in the first to fifth pixel groups may be compared among each other, rather than to predetermined thresholds. The dynamic vision sensor system may determine that a pixel group including an excessively greater or lesser number of first image pixels than the number of the other pixel groups is not an effective group, based on the result of comparison.

As a result of the determination in operation S23, a pixel group in which the number of first image pixels is greater than the first threshold value or smaller than the second threshold value may be determined as noise (S26). The dynamic vision sensor system may determine whether the shape of each of the pixel groups which pass operation S23 (e.g., which are within a size range determined by thresholds or by the other pixel group sizes) is circular in shape (S24). This may correspond to the case in which the actual shape of the object is circular, and the dynamic vision sensor system may compare the shape of the pixel group with the shape of the object known in advance in operation S24.

As a result of the comparison in operation S24, a pixel group having a shape corresponding to the actual shape of the object (e.g., a known object) may be classified as an effective group (S25), whereas a pixel group having a shape different from the actual shape of the object may be classified as noise (S26). As described above, the dynamic vision sensor system in an example embodiment may primarily filter data by binarizing the original image data based on whether effective data is output. Also, by forming a plurality of pixel groups by grouping the first image pixels recognized as having output effective data, and classifying noise from the effective groups based on the size and shape of each of the plurality of pixel groups, the result data of swiftly and accurately tracking the movement of the object may be output (S27).

Figure 11:
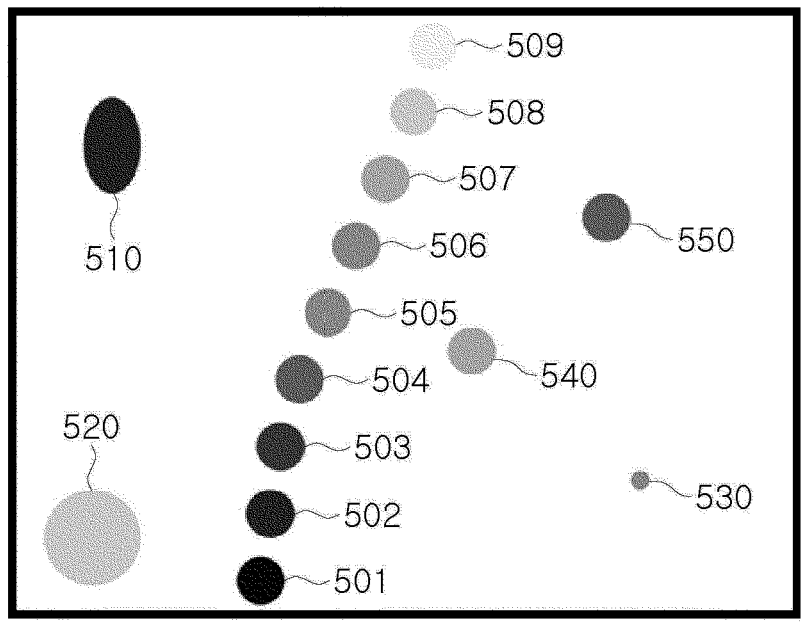
FIGS. 11 and 12 are diagrams that illustrate operations of a dynamic vision sensor system according to an example embodiment of the present disclosure.
Figure 12:
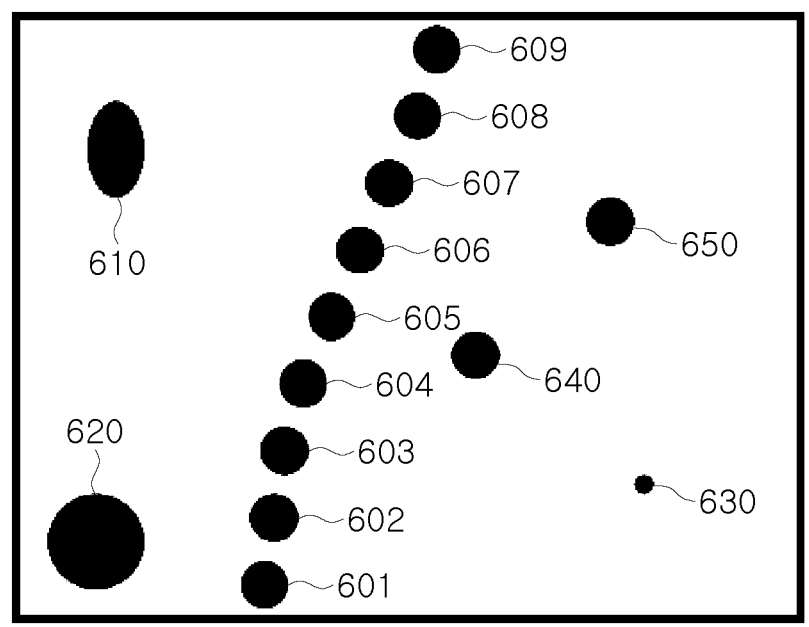

FIGS. 11 and 12 are diagrams that illustrate operations of a dynamic vision sensor system according to an example embodiment.

FIG. 11 illustrates original image data 500 generated by the dynamic vision sensor system according to an example embodiment. FIG. 12 illustrates binary image data 600 generated by binarizing the original image data 500 in the example embodiment illustrated in FIG. 11 by the dynamic vision sensor system according to an example embodiment.

Referring to FIG. 11, original image data 500 may include a plurality of effective areas 501-509 and a plurality of noise areas 510-550. As described above, the original image data 500 may be generated by accumulating a plurality of image frames obtained during a predetermined frame period. In the example embodiment in FIG. 11, the plurality of effective areas 501-509 may represent a trajectory of movement a circular object, and the plurality of noise areas 510-550 may appear on the original image data 500 by other causes unrelated to the object. For example, a ball to be tracked using the dynamic vision sensor system may appear. Each of the plurality of effective areas 501-509 may indicate the shape and position of the object at a time point at which each of the DVS pixels of the dynamic vision sensor system outputs an event signal.

The original image data 500 may include a plurality of image pixels, and each of the plurality of image pixels may correspond to DVS pixels included in the dynamic vision sensor system. A pixel value of each of the plurality of image pixels may correspond to a time stamp which may be a time point at which each of the DVS pixels has last output an event signal. For example, in the example embodiment illustrated in FIG. 11, an image pixel corresponding to a DVS pixel which has recently output an event signal may have a relatively large pixel value and may appear in a light shade (unlike FIG. 9, which illustrates an example in which the more recent DVS event corresponds to a darker shade). Accordingly, referring to the plurality of effective areas 501-509, it may be indicated that the object has moved from a position corresponding to the first effective area 501 to a position corresponding to the ninth effective area 509.

Thereafter, referring to FIG. 12, the dynamic vision sensor system may generate the binary image data 600 by binarizing the original image data 500. In the example embodiment in FIG. 12, the dynamic vision sensor system may allocate a first pixel value, which may be a maximum pixel value (e.g., a high value, or a black value), to each of pixels having a time stamp included in a predetermined period, and a second pixel value, which may be a minimum pixel value (e.g. a low value, or a white value), to each of the other pixels. Accordingly, the binary image data 600 may include first image pixels having a first pixel value and second image pixels having a second pixel value. In other example embodiments, a second pixel value which may be a minimum pixel value may be allocated to each of pixels having a time stamp included within a predetermined period, and a first pixel value which may be a maximum pixel value may be allocated to each of the other pixels.

The dynamic vision sensor system may generate a plurality of pixel groups 601-609 and 610-650 by grouping the first image pixels included in the binary image data 600. The plurality of pixel groups 601-609 and 610-650 may include a plurality of effective groups 601-609 corresponding to the movement of an object to be sensed, and a plurality of noise groups 610-650 generated by causes other than the object. Each of the plurality of effective groups 601 to 609 corresponding to the plurality of effective areas 501-509 may indicate the shape and position of an object at a time point at which each of the DVS pixels outputs an event signal.

The dynamic vision sensor system may determine whether each of the plurality of pixel groups 601-609 and 610-650 is an effective group based on the size and/or shape of each of the plurality of pixel groups 601-609 and 610-650 included in the binary image data 600. For example, the dynamic vision sensor system may know in advance the actual size and/or shape of the object to be sensed. Also, the number of first image pixels representing the object in a single frame period may be known in advance according to resolution of the dynamic vision sensor system, a focal length, and a distance to the object. The dynamic vision sensor system may filter the plurality of noise groups 610-650 determining whether the number of first image pixels included in each of the plurality of pixel groups 601-609 and 610-650 is within a predetermined range.

The plurality of noise groups 610-650 may be filtered based on the shape of the object in addition to the size of the object. For example, when the object to be sensed is public, image pixels in each of the effective groups 601-609 representing the object among the plurality of pixel groups 601-609 and 610-650 may be arranged in a shape similar to a circular shape. The dynamic vision sensor system may filter the plurality of noise groups 610-650 by comparing the arrangement shape of the first image pixels in each of the plurality of pixel groups 601-609 and 610-650 with the shape of the object. Hereinafter, the configuration will be described in greater detail with reference to FIGS. 13 to 16 together.

FIGS. 13 to 16 are diagrams that illustrate operations of a dynamic vision sensor system according to an example embodiment.

Figure 13:
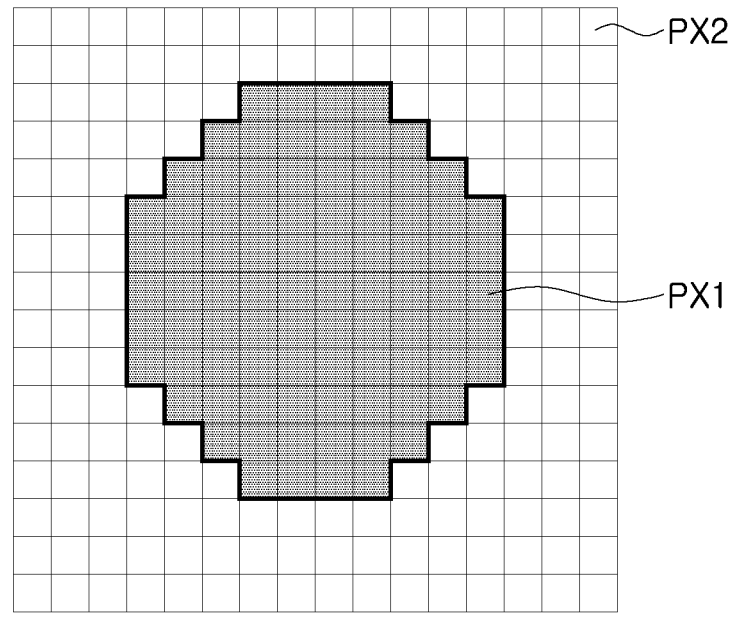
FIGS. 13 to 16 are diagrams that illustrate operations of a dynamic vision sensor system according to an example embodiment of the present disclosure.

FIG. 13 is an enlarged diagram that illustrates an area including the first effective group 601 among the plurality of effective groups 601 to 609 in the binary image data 600 according to the example embodiment illustrated in FIG. 12. Referring to FIG. 13, the binary image data 600 may include first image pixels PX1 having a first pixel value and second image pixels PX2 having a second pixel value as described above. The first pixel value may be a maximum pixel value, and the second pixel value may be a minimum pixel value. In another embodiment, this relationship may be reversed.

The dynamic vision sensor system may know in advance the shape of the object to be tracked and the area size of the area displaying the object in the binary image data 600. Accordingly, the dynamic vision sensor system may determine whether the first effective group 601 is an effective group by using the area size and/or the shape of the first effective group 601.

In the example embodiment in FIG. 13, the number of first image pixels PX1 included in the first effective group 601 may be 86 in total. For example, the dynamic vision sensor system may compare the number of first image pixels PX1 included in the first effective group 601 with a predetermined reference range. The number of first image pixels PX1 included in the first effective group 601 may fall within a reference range, and may be classified into the set of effective groups.

The dynamic vision sensor system may compare the shapes of the first image pixels PX1 included in the first effective group 601 with the shape of an object recognized in advance. For example, the object to be sensed may be a ball, and accordingly, the object may be represented in a shape similar to a circular shape in the binary image data 600. The first image pixels PX1 included in the first effective group 601 may have a shape similar to a circular shape, and accordingly, the dynamic vision sensor system may determine the first effective group 601 as the effective group. In an example embodiment, when the shape of the object is a circular shape, the dynamic vision sensor system may determine the shape of the effective group 601 using an area size calculated from the number of first image pixels PX1 included in the first effective group 601, and a length of the edge calculated from the boundary between the first image pixels PX1 and the second image pixels PX2; this length may correspond to a diameter in the case of a circular shape.

Figure 14:
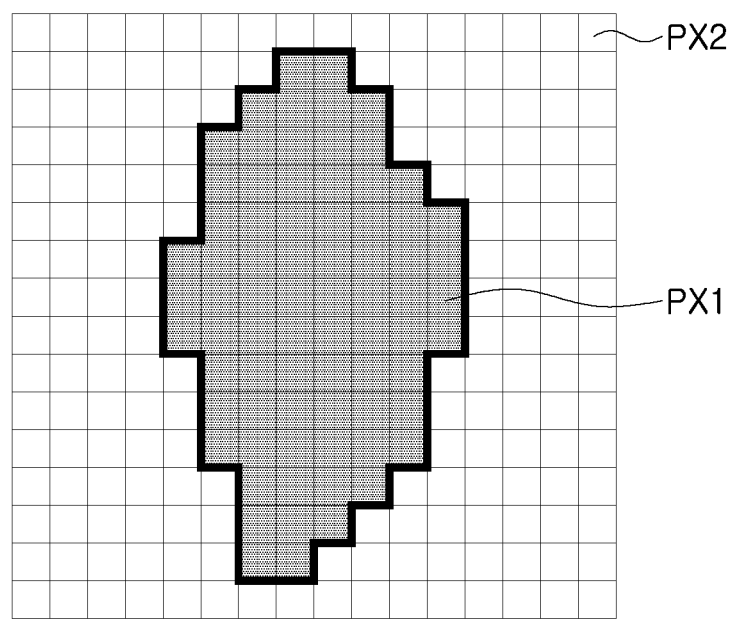

Thereafter, FIG. 14 is an enlarged diagram that illustrates an area including the first noise group 610 among the plurality of noise groups 610 to 650 in the binary image data 600 according to the example embodiment illustrated in FIG. 12. Referring to FIG. 14, the binary image data 600 may include first image pixels PX1 having a first pixel value and second image pixels PX2 having a second pixel value as described above.

In the example embodiment in FIG. 14, the number of first image pixels PX1 included in the first noise group 610 may be 75 in total. When the number of first image pixels PX1 included in the first noise group 610 is not included in the reference range used as a criterion for determining the effective group, the dynamic vision sensor system may determine that the first noise group 610 is not an effective group, and will not be classified into the set of effective groups.

However, depending on how the reference range is configured, the number of first image pixels PX1 included in the first noise group 610 may be included in the reference range used as a criterion for determining the effective group. The dynamic vision sensor system in an example embodiment may determine the shape of the first noise group 610 from the arrangement shape of the first image pixels PX1 included in the first noise group 610. The dynamic vision sensor system may compare the shape of the first noise group 610 with the shape of an object recognized in advance.

As described above, the object may be known to have a circular shape and may be a ball represented in the binary image data 600. The first noise group 610 may have an elliptical shape extending longer in the vertical direction than in the horizontal direction, rather than a circular shape. Accordingly, the dynamic vision sensor system may determine that the first noise group 610 is not an effective group based on the shape of the first noise group 610.

Figure 15:
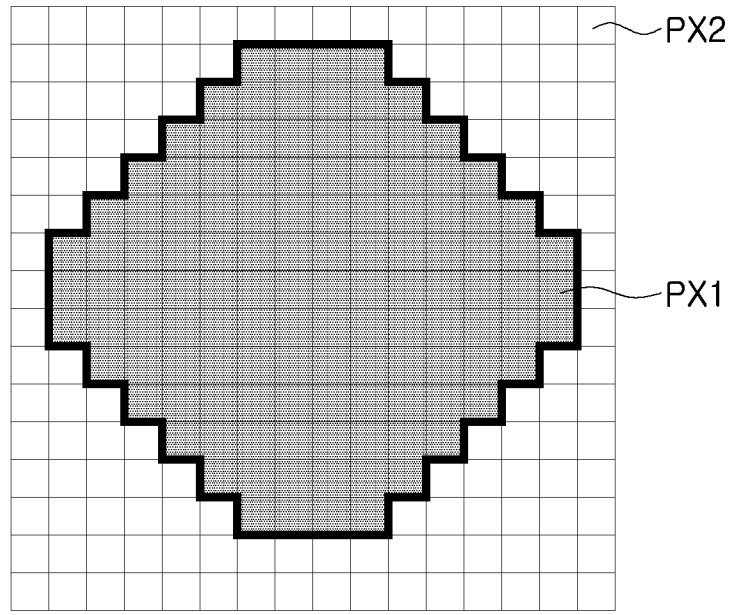

FIG. 15 is an enlarged diagram that illustrates an area including the second noise group 620 among the plurality of noise groups 610-650 in the binary image data 600 according to the example embodiment illustrated in FIG. 12. As described above, the binary image data 600 may include first image pixels PX1 having a first pixel value and second image pixels PX2 having a second pixel value.

In the example embodiment illustrated in FIG. 15, the second noise group 620 may have a shape similar to a circular shape, which is a shape of an object that the dynamic vision sensor system has recognized in advance. Accordingly, if/when the shape of the pixel group is compared with the shape of the object, the second noise group 620 may not be filtered as noise.

Referring to FIG. 15, the number of first image pixels PX1 included in the second noise group 620 may be 122 in total. In this example, the number of first image pixels PX1 included in the second noise group 620 may not be included in a reference range used as a criterion for determining the effective group, and the dynamic vision sensor system may determine that the second noise group 620 is not an effective group.

Figure 16:
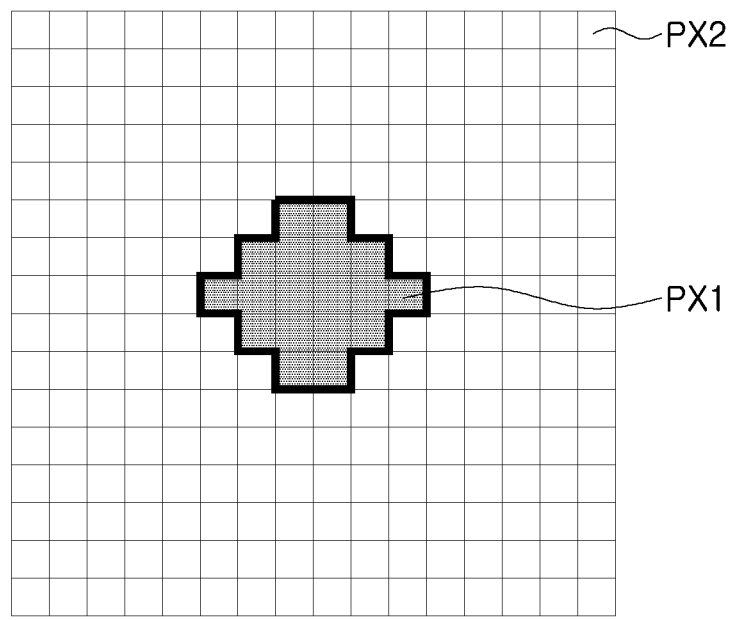

Thereafter, FIG. 16 illustrates an area including the third noise group 630 among the plurality of noise groups 610 to 650 in the binary image data 600 according to the example embodiment illustrated in FIG. 12. Pixels of the binary image data 600 may be classified into first image pixels PX1 having a first pixel value and second image pixels PX2 having a second pixel value.

Similarly to the example embodiment described above with reference to FIG. 15, in the example embodiment illustrated in FIG. 16, the third noise group 630 may have a shape similar to a circular shape, which may be the shape of an object recognized in advance by the dynamic vision sensor system. Accordingly, if/when the shape of the pixel group is compared with the shape of the object, the third noise group 630 may not be filtered as noise.

However, referring to FIG. 16, the number of first image pixels PX1 included in the third noise group 630 may be 18 in total. In this example, the number of first image pixels PX1 included in the third noise group 630 may not be included in a reference range which may be a reference range for determining the effective group, and the dynamic vision sensor system may determine that the third noise group 630 is not an effective group and may filter the group.

As described with reference to FIGS. 13 to 16, the dynamic vision sensor system in an example embodiment may form a plurality of pixel groups by grouping first image pixels PX1 adjacent to each other in the binary image data. The dynamic vision sensor system may select effective groups from the plurality of pixel groups by comparing the shape and area size of each of the plurality of pixel groups with a predetermined reference shape and a predetermined reference range of area size, and may filter the other as noise.

However, as illustrated in FIG. 12, at least one of the plurality of noise groups 610 to 650 included in the binary image data 600 might not be filtered when using the size and shape of the object. Referring to FIG. 12, the fourth noise group 640 and the fifth noise group 650 may have a circular shape and size similar to those of the plurality of effective groups 601 to 609 representing the movement of an object. Accordingly, the fourth noise group 640 and the fifth noise group 650 may not be determined as noise when being compared against the size and shape of an object, and accordingly, the groups may remain without being filtered.

In an example embodiment, noise groups may be filtered from a plurality of pixel groups using the area size and shape of each of the plurality of pixel groups, and may select a plurality of effective groups representing an object from the remaining pixel groups using a trajectory generated by selecting at least a portion of the remaining pixel groups which have not been filtered. When the plurality of effective groups are selected, the dynamic vision sensor system may output result data in which the plurality of effective groups are displayed. For example, the result data may be image data, and the moving speed and the moving direction of the object may be output together with the image data. Hereinafter, the configuration will be described with reference to FIGS. 17 to 20.

FIGS. 17 to 20 are diagrams that illustrate operations of a dynamic vision sensor system according to an example embodiment.

Figure 17:
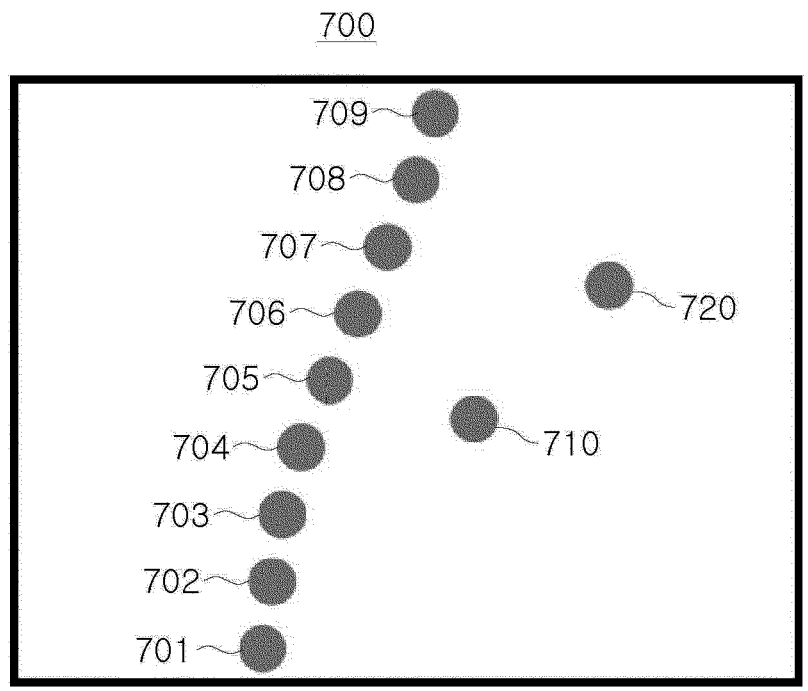
FIGS. 17 to 20 are diagrams that illustrate operations of a dynamic vision sensor system according to an example embodiment of the present disclosure.

FIG. 17 is illustrative of image data obtained by filtering noise groups in the binary image data based on at least one of the shape and size of each of the plurality of pixel groups included in the binary image data. Referring to FIG. 17, image data 700 may include a plurality of pixel groups 701-710, 720.

However, in the image data 700 according to the example embodiment illustrated in FIG. 17, the tenth pixel group 710 and the eleventh pixel group 720 among the plurality of pixel groups 701-710, 720 may be data reflected due to an event signal generated causes other than the object intended to be tracked by the dynamic vision sensor system. Still, the tenth pixel group 710 and the eleventh pixel group 720 may have similar shapes and sizes to those of the remaining first to ninth pixel groups 701-709, and may not be classified as noise during the filtering process using the shape and size of each of the plurality of pixel groups 701-710, 720.

The dynamic vision sensor system in an example embodiment may remove an outlier from a plurality of pixel groups 701-710, 720 using a RANdom sample consensus (RANSAC) model, and may select a plurality of effective groups. For example, the dynamic vision sensor system may generate an arbitrary trajectory by selecting a portion of the plurality of pixel groups 701-710, 720. The dynamic vision sensor system may compare the generated trajectory with the positions of the plurality of pixel groups 701-710, 720, and the number of pixel groups having positions not matching the generated trajectory among the plurality of pixel groups 701-710, 720 may be counted.

The dynamic vision sensor system may generate a plurality of trajectories by selecting a portion of the plurality of pixel groups 701-710, 720 in various combinations, and may select a trajectory passing through the largest number of pixel groups among the plurality of pixel groups 701-710, 720 as the correct trajectory of movement of the object among a plurality of trajectories. Accordingly, among the plurality of pixel groups 701-710, 720, the tenth pixel group 710 and the eleventh pixel group 720 which may not be filtered based on the size and shape may be determined as noise.

Figure 18:
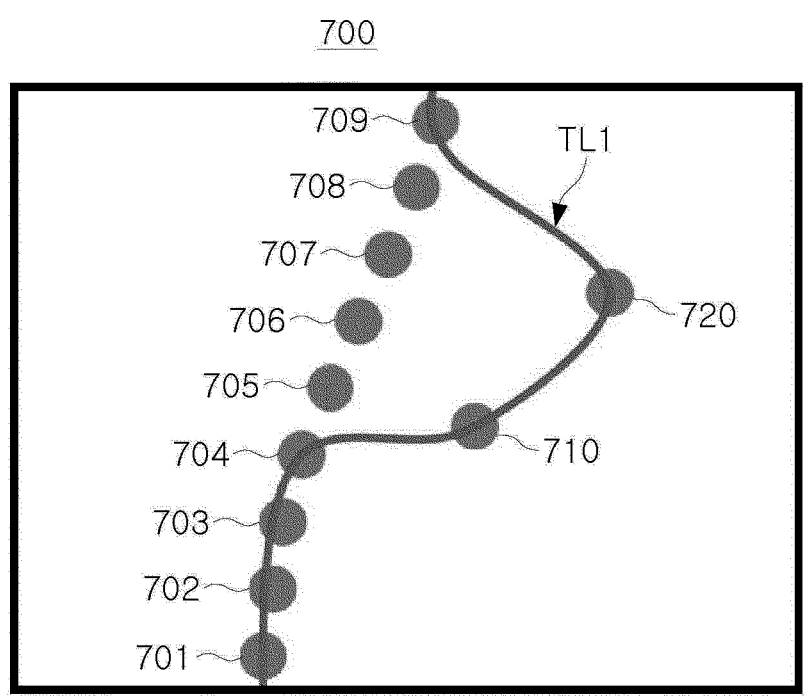

Referring to FIG. 18, the dynamic vision sensor system may generate a first trajectory TL1 by selecting a first pixel group 701, a fourth pixel group 704, a ninth pixel group 709, a ninth pixel group 709, a ten pixel group 710, and an eleventh pixel group 720 among a plurality of pixel groups 701-710, 720. When the first trajectory TL1 is generated, the dynamic vision sensor system may compare a path of the first trajectory TL1 with coordinates of each of the plurality of pixel groups 701-710, 720.

In an example embodiment, a predetermined range may be determined based on the first trajectory TL1, and it may be determined whether the coordinates of each of the plurality of pixel groups 701-710, 720 are positioned in the corresponding range. In the example embodiment in FIG. 18, the coordinates of each of the fifth to eighth pixel groups 705-708 may not be positioned within a range determined based on the first trajectory TL1.

Figure 19:
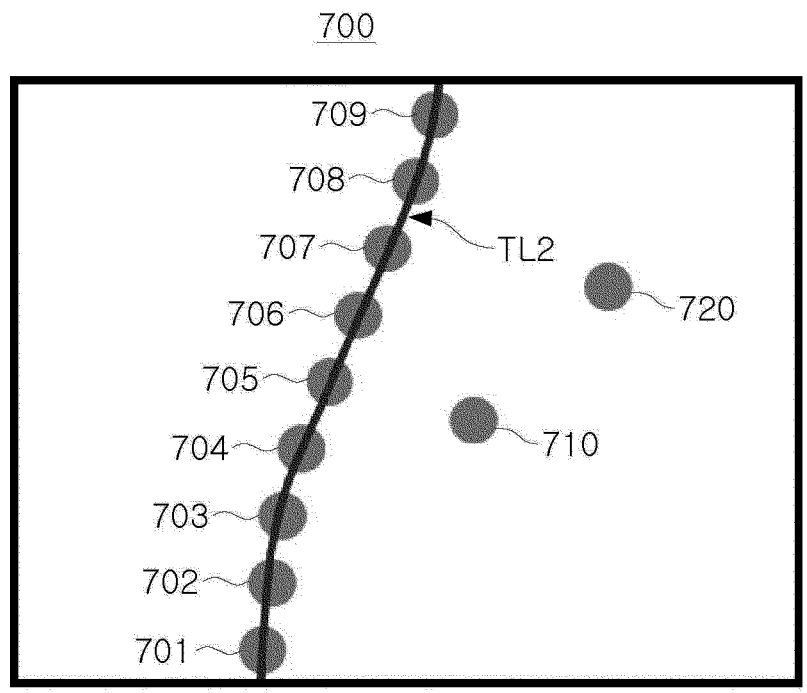

Thereafter, referring to FIG. 19, the dynamic vision sensor system may generate a second trajectory TL2 by selecting a first pixel group 701, a fourth pixel group 704, a seventh pixel group 707, and a ninth pixel group 709 among the plurality of pixel groups 701-710, 720. Similarly to the example described with reference to FIG. 18, when the second trajectory TL2 is generated, the dynamic vision sensor system may determine a predetermined range based on the second trajectory TL2, and may determine whether coordinates of the plurality of pixel groups 701-710, 720 are positioned within the range.

In the example embodiment in FIG. 19, the coordinates of each of the first to ninth pixel groups 701-709 other than the tenth pixel group 710 and the eleventh pixel group 720 may be positioned within the range determined with respect to the second trajectory TL2. Accordingly, the dynamic vision sensor system may determine that the second trajectory TL2 among the first trajectory TL1 and the second trajectory TL2 corresponds to the movement of the object.

Figure 20:
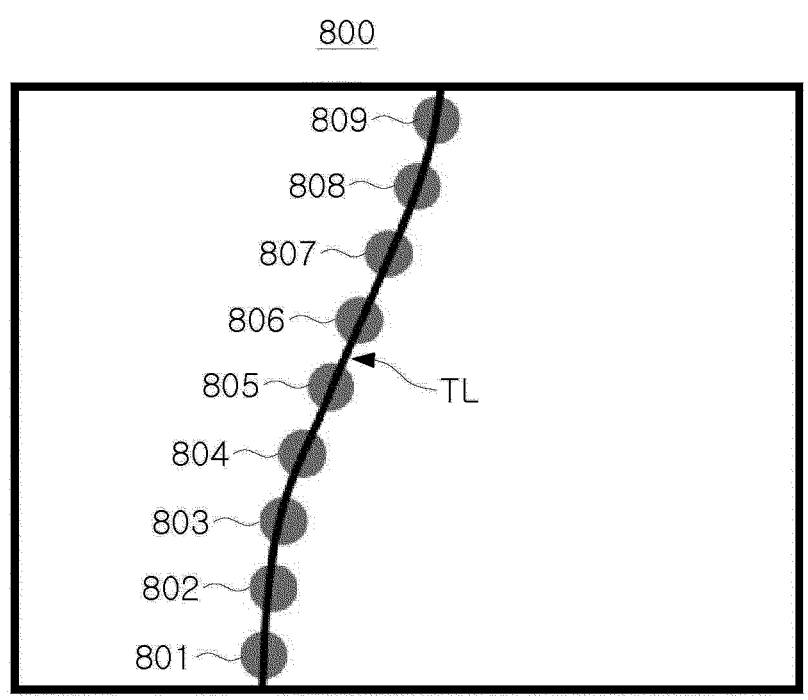

The dynamic vision sensor system may determine the tenth pixel group 710 and the eleventh pixel group 720 not matching the selected second trajectory TL2 as noise. Accordingly, the accurate result data 800 as illustrated in FIG. 20 may be output. Referring to FIG. 20, the dynamic vision sensor system may remove the tenth pixel group 710 and the eleventh pixel group 720 as noise from the image data 700 as illustrated in FIG. 17, and may output the result data 800 in which the first to ninth pixel groups 801-809 are displayed.

The dynamic vision sensor system may output the result data 800 including the second trajectory TL2 determined as the path corresponding to the movement of the object as the final trajectory TL. Also, the movement speed of the object may be output together with the data 800 by referring to the frame period.

According to the aforementioned example embodiments, a plurality of candidate groups may be defined by generating image data from raw data generated based on event signals of the dynamic vision sensor system and grouping pixels according to pixel values appearing in the image data. By selecting a plurality of effective groups from the plurality of candidate groups based on the shape, size, and trajectory of the object of which the movement is to be tracked, result data representing the movement of the object may be output. Accordingly, the trajectory of a moving object may be swiftly and accurately tracked at a high speed.

While the example embodiments have been illustrated and described above, it will be apparent to those skilled in the art that modifications and variations could be made without departing from the scope of the present disclosure as defined by the appended claims.

What is claimed is:

1. A method of operating a dynamic vision sensor system, comprising:

obtaining event signals from a plurality of dynamic vision sensor (DVS) pixels over a predetermined time period, wherein the event signals correspond to a measured change in light;

obtaining original image data based on the event signals output by the plurality of DVS pixels the plurality of dynamic vision sensor pixels respectively correspond to a plurality of image pixels;

obtaining binary image data by binarizing pixel values of the plurality of image pixels;

defining a plurality of pixel groups from the plurality of image pixels in using the binary image data; and selecting a plurality of effective groups from among the plurality of pixel groups, wherein each effective group of the plurality of effective groups has at least one of a size, a shape, or a trajectory corresponding to a size, a shape, or a trajectory of an object to be detected in the original image data, and outputting result data representing the plurality of effective groups.

2. The method of claim 1, wherein selecting the plurality of effective groups further comprises determining that the size of each effective group of the plurality of effective groups is to be within a size range determined by a plurality of thresholds.

3. The method of claim 2, selecting the plurality of effective groups further comprises comparing a shape of each effective group of the plurality of effective groups having a size within the size range to the shape of the object.

4. The method of claim 1, wherein the result data further includes trajectory information about the object.

5. The method of claim 1, further comprising:
determining the plurality of pixel groups by grouping image pixels of the plurality of image pixels that have a same binarizing pixel value and are adjacent to each other; and
applying a RANSAC (RANdom SAmple Consensus) model to the plurality of pixel groups to remove at least one pixel group from the plurality of pixel groups and select the plurality of effective groups.

6. The method of claim 1, wherein the plurality of effective groups are selected from the plurality of pixel groups by comparing a number of image pixels included in each of the plurality of pixel groups with a predetermined threshold value.

7. The method of claim 1,
wherein each of the plurality of DVS pixels includes a photodiode, a current/voltage converter connected to the photodiode, an amplifier circuit connected to an output terminal of the current/voltage converter, and a comparator circuit connected to an output terminal of the amplifier circuit, and
wherein the comparator circuit includes a first comparator configured to output an ON event signal in response to an increase in brightness of light and a second comparator configured to output an OFF event signal in response to a decrease in brightness of light.

8. The method of claim 7, wherein the binary image data is generated by classifying the plurality of image pixels included in the original image data into a first portion of image pixels having a predetermined DVS pixel value, and into a second portion of image pixels having a pixel value different from the predetermined DVS pixel value, wherein the DVS pixel value of the image pixel is based on a number of times the corresponding dynamic vision sensor pixel output an event signal during the predetermined time period.

9. The method of claim 8, wherein each of the image pixels in the first outputs the ON event signal and the OFF event signal one time during the predetermined time period.

10. The method of claim 9, wherein the first portion and the second portion of the image pixels are filtered based on a time stamp of each of image pixel of the plurality of image pixels.

11. The method of claim 9, wherein the first portion and the second portion of the image pixels are filtered based on a value of a last output event signal, among the ON event signal and the OFF event signal.

12. The method of claim 1,
wherein the binary image data is obtained by binarizing each of the plurality of image pixels in the original image data into a first image pixel having a first pixel value or into a second image pixel having a second pixel value, and
wherein the plurality of pixel groups are defined by grouping image pixels of the first image pixels that are adjacent to each other in the binary image data.

13. The method of claim 12, wherein the first pixel value is a high pixel value, and the second pixel value is a low pixel value.

14. The method of claim 1, wherein the original image data is generated by accumulating two or more image frames obtained during the predetermined time period, and the binary image data is obtained by binarizing the original image data.

15. A method of operating a dynamic vision sensor system, the method comprising:
obtaining original image data including a plurality of image pixels corresponding to a plurality of dynamic vision sensor (DVS) pixels;
classifying the plurality of image pixels into first image pixels having a first pixel value and second image pixels having a second pixel value different from the first pixel value;
grouping the first image pixels into a plurality of pixel groups;
selecting a plurality of effective groups from the plurality of pixel groups by determining the number of first image pixels in each of the plurality of pixel groups, determining an arrangement shape of the first image pixels in each of the plurality of pixel groups, and selecting a pixel group as an effective pixel group based on the number of first image pixels and the arrangement shape; and
determining a movement speed and trajectory of an object using the plurality of effective groups.

16. The method of claim 15, wherein each of the plurality of DVS pixels outputs an event signal in response to a change in light, and each of the plurality of image pixels has a pixel value based on the event signal, and
the first pixel value is a DVS pixel value of 2, wherein the DVS pixel value of the image pixel is based on a number of times a corresponding DVS pixel output an event signal during a predetermined time period.

17. The method of claim 16, wherein the event signal is either a first event signal or a second event signal, and wherein the first event signal is output by a DVS pixel in response to sensing an increase in light, and the second event signal is output by a DVS pixel in response to sensing a decrease in light.

18. The method of claim 15, wherein a pixel group that has a number of the first image pixels equal to or less than a first threshold value and equal to or greater than a second threshold value smaller than the first threshold value from among the plurality of pixel groups is selected as an effective group.

19. A method of operating a dynamic vision sensor system, the method comprising:
obtaining image data having a plurality of image pixels corresponding to a plurality of dynamic vision sensor (DVS) pixels configured to detect a change in light caused by movement of an object;
obtaining a plurality of pixel groups by grouping first image pixels from among the plurality of image pixels, wherein the first image pixels correspond to DVS pixels that detected a change in light over a predetermined period;
selecting a plurality of effective groups from the plurality of pixel groups over a plurality of time points,
wherein the plurality of effective groups are selected from the plurality of pixel groups by comparing a shape of each pixel group of the plurality of pixel groups with a shape of the object, and
each effective group of the plurality of effective groups represents a position of the object at a time point of the plurality of time points; and
determining movement of the object using the plurality of effective groups.

20. The method of claim 19, wherein the plurality of effective groups are selected based on a number of first image pixels included in each of the plurality of pixel groups, a time stamp of the first image pixels in each of the plurality of pixel groups, and a DVS pixel value of the first image pixels in each of the plurality of pixel groups, wherein the DVS pixel value of the first image pixel is based on the number of times the DVS pixel corresponding to the first image pixel detected a change in light during the predetermined time period, and wherein the time stamp of the first image pixel represents a last time the DVS pixel corresponding to the first image pixel detected the change in light.

* * * * *